United States Patent
Merriman et al.

(10) Patent No.: US 10,997,211 B2
(45) Date of Patent: May 4, 2021

(54) SYSTEMS AND METHODS FOR DATABASE ZONE SHARDING AND API INTEGRATION

(71) Applicant: MongoDB, Inc., New York, NY (US)

(72) Inventors: Dwight Merriman, New York, NY (US); Eliot Horowitz, New York, NY (US); Cory P. Mintz, Millstone Township, NJ (US); Cailin Anne Nelson, Boulder, CO (US); Akshay Kumar, New York, NY (US); David Lenox Storch, Brooklyn, NY (US); Charles William Swanson, New York, NY (US); Keith Bostic, Lincoln, MA (US); Michael Cahill, Summer Hill (AU); Dan Pasette, Brooklyn, NY (US); Mathias Benjamin Stearn, New York, NY (US); Geert Bosch, Brooklyn, NY (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 16/013,706

(22) Filed: Jun. 20, 2018

(65) Prior Publication Data
US 2018/0300385 A1 Oct. 18, 2018

Related U.S. Application Data

(63) Continuation-in-part of application No. 15/654,590, filed on Jul. 19, 2017, now Pat. No. 10,740,355, which is a continuation of application No. 13/078,104, filed on Apr. 1, 2011, now Pat. No. 9,740,762, application No. 16/013,706, which is a
(Continued)

(51) Int. Cl.
*G06F 17/30* (2006.01)
*G06F 16/27* (2019.01)

(52) U.S. Cl.
CPC .................................. *G06F 16/278* (2019.01)

(58) Field of Classification Search
None
See application file for complete search history.

(56) References Cited

U.S. PATENT DOCUMENTS

| 4,918,593 A | 4/1990 | Huber |
| 5,379,419 A | 1/1995 | Heffernan et al. |

(Continued)

OTHER PUBLICATIONS

U.S. Appl. No. 15/074,987, filed Mar. 18, 2016, Merriman.
(Continued)

*Primary Examiner* — Hung D Le
(74) *Attorney, Agent, or Firm* — Wolf, Greenfield & Sacks, P.C.

(57) ABSTRACT

Systems and methods are provided to enable control and placement of data repositories. In some embodiments, the system segments data into zones. A website, for example, may need to segment data according to location. In this example, a zone may be created for North America and another zone may be created for Europe. Data related to operations executed in North America, for example, can be placed in the North America zone and data related to transactions in Europe can be placed in the Europe zone. According to some embodiments, the system may use zones to accommodate a range of deployment scenarios.

20 Claims, 13 Drawing Sheets

Related U.S. Application Data continuation-in-part of application No. 15/605,391, filed on May 25, 2017, now Pat. No. 10,366,100, which is a continuation-in-part of application No. 15/042,297, filed on Feb. 12, 2016, now Pat. No. 10,031,956, which is a continuation of application No. 13/951,987, filed on Jul. 26, 2013, now Pat. No. 9,262,462, which is a continuation-in-part of application No. 13/794,710, filed on Mar. 11, 2013, now Pat. No. 8,996,463, said application No. 15/605,391 is a continuation-in-part of application No. 14/672,901, filed on Mar. 30, 2015, now Pat. No. 9,792,322, which is a continuation of application No. 13/794,710, filed on Mar. 11, 2013, now Pat. No. 8,996,463, application No. 16/013,706, which is a continuation-in-part of application No. 15/074,987, filed on Mar. 18, 2016, now Pat. No. 10,621,200, which is a continuation of application No. 14/064,705, filed on Oct. 28, 2013, now Pat. No. 9,317,576, which is a continuation of application No. 12/977,563, filed on Dec. 23, 2010, now Pat. No. 8,572,031, application No. 16/013,706, which is a continuation-in-part of application No. 14/992,225, filed on Jan. 11, 2016, now Pat. No. 10,262,050.

(60) Provisional application No. 62/522,222, filed on Jun. 20, 2017, provisional application No. 62/341,511, filed on May 25, 2016, provisional application No. 62/341,490, filed on May 25, 2016, provisional application No. 61/676,188, filed on Jul. 26, 2012, provisional application No. 62/232,979, filed on Sep. 25, 2015.

(56) References Cited

U.S. PATENT DOCUMENTS

| | | | |
|---|---|---|---|
| 5,416,917 A | 5/1995 | Adair et al. | |
| 5,471,629 A | 11/1995 | Risch | |
| 5,551,027 A | 8/1996 | Choy et al. | |
| 5,598,559 A | 1/1997 | Chaudhuri | |
| 5,710,915 A | 1/1998 | McElhiney | |
| 5,884,299 A | 3/1999 | Ramesh et al. | |
| 5,999,179 A | 12/1999 | Kekic et al. | |
| 6,065,017 A | 5/2000 | Barker | |
| 6,088,524 A | 7/2000 | Levy et al. | |
| 6,112,201 A | 8/2000 | Wical | |
| 6,115,705 A | 9/2000 | Larson | |
| 6,240,406 B1 | 5/2001 | Tannen | |
| 6,240,514 B1 | 5/2001 | Inoue et al. | |
| 6,249,866 B1 | 6/2001 | Brundett et al. | |
| 6,324,540 B1 | 11/2001 | Khanna et al. | |
| 6,324,654 B1 | 11/2001 | Wahl et al. | |
| 6,339,770 B1 | 1/2002 | Leung et al. | |
| 6,351,742 B1 | 2/2002 | Agarwal et al. | |
| 6,363,389 B1 | 3/2002 | Lyle et al. | |
| 6,385,201 B1 | 5/2002 | Iwata | |
| 6,385,604 B1 | 5/2002 | Bakalash et al. | |
| 6,496,843 B1 | 12/2002 | Getchius et al. | |
| 6,505,187 B1 | 1/2003 | Shatdal | |
| 6,611,850 B1 | 8/2003 | Shen | |
| 6,687,846 B1 | 2/2004 | Adrangi et al. | |
| 6,691,101 B2 | 2/2004 | MacNicol et al. | |
| 6,801,905 B2 | 10/2004 | Andrei | |
| 6,823,474 B2 | 11/2004 | Kampe et al. | |
| 6,920,460 B1 | 7/2005 | Srinivasan et al. | |
| 6,959,369 B1 | 10/2005 | Ashton et al. | |
| 7,020,649 B2 | 3/2006 | Cochrane et al. | |
| 7,032,089 B1 | 4/2006 | Ranade et al. | |
| 7,082,473 B2 | 7/2006 | Breitbart et al. | |
| 7,177,866 B2 | 2/2007 | Holenstein et al. | |
| 7,181,460 B2 | 2/2007 | Coss et al. | |
| 7,191,299 B1 | 3/2007 | Kekre et al. | |
| 7,246,345 B1 | 7/2007 | Sharma et al. | |
| 7,447,807 B1* | 11/2008 | Merry | G06F 3/0604 710/8 |
| 7,467,103 B1 | 12/2008 | Murray et al. | |
| 7,469,253 B2 | 12/2008 | Celis et al. | |
| 7,472,117 B2 | 12/2008 | Dettinger et al. | |
| 7,486,661 B2 | 2/2009 | Van den Boeck et al. | |
| 7,548,928 B1 | 6/2009 | Dean et al. | |
| 7,552,356 B1 | 6/2009 | Waterhouse et al. | |
| 7,558,481 B2 | 7/2009 | Jenkins et al. | |
| 7,567,991 B2 | 7/2009 | Armangau et al. | |
| 7,617,369 B1 | 11/2009 | Bezbaruah et al. | |
| 7,634,459 B1 | 12/2009 | Eshet et al. | |
| 7,647,329 B1 | 1/2010 | Fischman et al. | |
| 7,657,570 B2 | 2/2010 | Wang et al. | |
| 7,657,578 B1 | 2/2010 | Karr et al. | |
| 7,668,801 B1 | 2/2010 | Koudas et al. | |
| 7,761,465 B1 | 7/2010 | Nonaka et al. | |
| 7,957,284 B2 | 6/2011 | Lu et al. | |
| 7,962,458 B2 | 6/2011 | Holenstein et al. | |
| 8,005,804 B2 | 8/2011 | Greer | |
| 8,005,868 B2 | 8/2011 | Saborit et al. | |
| 8,037,059 B2 | 10/2011 | Bestgen et al. | |
| 8,078,825 B2 | 12/2011 | Oreland et al. | |
| 8,082,265 B2 | 12/2011 | Carlson et al. | |
| 8,086,597 B2 | 12/2011 | Balmin et al. | |
| 8,099,572 B1 | 1/2012 | Arora et al. | |
| 8,103,906 B1 | 1/2012 | Alibakhsh et al. | |
| 8,108,443 B2 | 1/2012 | Thusoo | |
| 8,126,848 B2 | 2/2012 | Wagner | |
| 8,170,984 B2 | 5/2012 | Bakalash et al. | |
| 8,260,840 B1 | 9/2012 | Sirota et al. | |
| 8,296,419 B1 | 10/2012 | Khanna et al. | |
| 8,305,999 B2* | 11/2012 | Palanki | H04L 5/0012 370/335 |
| 8,321,558 B1 | 11/2012 | Sirota et al. | |
| 8,352,450 B1 | 1/2013 | Mraz et al. | |
| 8,352,463 B2 | 1/2013 | Nayak | |
| 8,363,961 B1 | 1/2013 | Avidan et al. | |
| 8,370,857 B2 | 2/2013 | Kamii et al. | |
| 8,386,463 B2 | 2/2013 | Bestgen et al. | |
| 8,392,482 B1 | 3/2013 | McAlister et al. | |
| 8,539,197 B1* | 9/2013 | Marshall | G06F 13/00 711/112 |
| 8,572,031 B2 | 10/2013 | Merriman et al. | |
| 8,589,382 B2 | 11/2013 | Betawadkar-Norwood | |
| 8,589,574 B1 | 11/2013 | Cormie et al. | |
| 8,615,507 B2 | 12/2013 | Varadarajulu et al. | |
| 8,712,044 B2 | 4/2014 | MacMillan et al. | |
| 8,712,993 B1 | 4/2014 | Ordonez | |
| 8,751,533 B1 | 6/2014 | Dhavale et al. | |
| 8,843,441 B1 | 9/2014 | Rath et al. | |
| 8,869,256 B2 | 10/2014 | Sample | |
| 8,996,463 B2 | 3/2015 | Merriman et al. | |
| 9,015,431 B2 | 4/2015 | Resch et al. | |
| 9,069,827 B1 | 6/2015 | Rath et al. | |
| 9,116,862 B1 | 8/2015 | Rath et al. | |
| 9,141,814 B1 | 9/2015 | Murray | |
| 9,183,254 B1 | 11/2015 | Cole et al. | |
| 9,262,462 B2 | 2/2016 | Merriman et al. | |
| 9,268,639 B2* | 2/2016 | Leggette | H04L 67/1097 |
| 9,274,902 B1 | 3/2016 | Morley et al. | |
| 9,313,604 B1 | 4/2016 | Holcombe | |
| 9,317,576 B2 | 4/2016 | Merriman et al. | |
| 9,350,633 B2 | 5/2016 | Cudak et al. | |
| 9,350,681 B1 | 5/2016 | Kitagawa et al. | |
| 9,460,008 B1 | 10/2016 | Leshinsky et al. | |
| 9,495,427 B2 | 11/2016 | Abadi et al. | |
| 9,569,481 B1 | 2/2017 | Chandra et al. | |
| 9,628,404 B1 | 4/2017 | Goffinet et al. | |
| 9,660,666 B1 | 5/2017 | Ciarlini et al. | |
| 9,715,433 B2 | 7/2017 | Mu et al. | |
| 9,740,762 B2 | 8/2017 | Horowitz et al. | |
| 9,792,322 B2 | 10/2017 | Merriman et al. | |
| 9,800,685 B2 | 10/2017 | Neerincx et al. | |
| 9,805,108 B2 | 10/2017 | Merriman et al. | |
| 9,881,034 B2 | 1/2018 | Horowitz et al. | |
| 9,959,308 B1 | 5/2018 | Carman et al. | |

(56) References Cited

U.S. PATENT DOCUMENTS

| | | |
|---|---|---|
| 10,031,931 B2 | 7/2018 | Horowitz et al. |
| 10,031,956 B2 | 7/2018 | Merriman et al. |
| 10,262,050 B2 | 4/2019 | Bostic et al. |
| 10,303,570 B2 | 5/2019 | Nakajima |
| 10,346,430 B2 | 7/2019 | Horowitz et al. |
| 10,346,434 B1 | 7/2019 | Morkel et al. |
| 10,366,100 B2 | 7/2019 | Horowitz et al. |
| 10,372,926 B1 | 8/2019 | Leshinsky et al. |
| 10,394,822 B2 | 8/2019 | Stearn |
| 10,423,626 B2 | 9/2019 | Stearn et al. |
| 10,430,433 B2 | 10/2019 | Stearn et al. |
| 10,474,645 B2 | 11/2019 | Freedman et al. |
| 10,489,357 B2 | 11/2019 | Horowitz et al. |
| 10,496,669 B2 | 12/2019 | Merriman et al. |
| 10,614,098 B2 | 4/2020 | Horowitz et al. |
| 10,621,050 B2 | 4/2020 | Horowitz et al. |
| 10,621,200 B2 | 4/2020 | Merriman et al. |
| 10,671,496 B2 | 6/2020 | Horowitz et al. |
| 10,673,623 B2 | 6/2020 | Horowitz et al. |
| 10,698,775 B2 | 6/2020 | Horowitz et al. |
| 10,713,275 B2 | 7/2020 | Merriman et al. |
| 10,713,280 B2 | 7/2020 | Horowitz et al. |
| 10,776,220 B2 | 9/2020 | Horowitz et al. |
| 2001/0021929 A1 | 9/2001 | Lin et al. |
| 2002/0029207 A1 | 3/2002 | Bakalash et al. |
| 2002/0065675 A1 | 5/2002 | Grainger et al. |
| 2002/0065676 A1 | 5/2002 | Grainger et al. |
| 2002/0065677 A1 | 5/2002 | Grainger et al. |
| 2002/0143901 A1 | 10/2002 | Lupo et al. |
| 2002/0147842 A1 | 10/2002 | Breitbart et al. |
| 2002/0184239 A1 | 12/2002 | Mosher, Jr. et al. |
| 2003/0046307 A1 | 3/2003 | Rivette et al. |
| 2003/0212668 A1 | 4/2003 | Hinshaw et al. |
| 2003/0084073 A1 | 5/2003 | Hotti et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0078569 A1 | 4/2004 | Hotti |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0236743 A1 | 11/2004 | Blaicher et al. |
| 2004/0254919 A1 | 12/2004 | Giuseppini |
| 2005/0027796 A1 | 2/2005 | San Andres et al. |
| 2005/0033756 A1 | 2/2005 | Kottomtharayil |
| 2005/0038833 A1 | 2/2005 | Colrain et al. |
| 2005/0192921 A1 | 9/2005 | Chaudhuri et al. |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0235905 A1 | 10/2006 | Kapur |
| 2006/0287998 A1 | 12/2006 | Folting et al. |
| 2006/0288232 A1 | 12/2006 | Ho et al. |
| 2006/0294129 A1 | 12/2006 | Stanfill et al. |
| 2007/0050436 A1 | 3/2007 | Chen et al. |
| 2007/0061487 A1 | 3/2007 | Moore et al. |
| 2007/0094237 A1 | 4/2007 | Mitchell et al. |
| 2007/0124317 A1 | 5/2007 | Dettinger et al. |
| 2007/0203944 A1 | 8/2007 | Batra et al. |
| 2007/0226640 A1 | 9/2007 | Holbrook et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0005475 A1 | 1/2008 | Lubbers et al. |
| 2008/0016021 A1 | 1/2008 | Gulbeden et al. |
| 2008/0071755 A1* | 3/2008 | Barsness ............... G06F 16/284 |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0058010 A1 | 3/2010 | Augenstein et al. |
| 2010/0094851 A1 | 4/2010 | Bent et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0223078 A1 | 9/2010 | Willis et al. |
| 2010/0235606 A1 | 9/2010 | Oreland et al. |
| 2010/0250930 A1 | 9/2010 | Csaszar et al. |
| 2010/0333111 A1 | 12/2010 | Kothamasu et al. |
| 2010/0333116 A1 | 12/2010 | Prahlad et al. |
| 2011/0022642 A1 | 1/2011 | deMilo et al. |
| 2011/0125704 A1 | 5/2011 | Mordvinova et al. |
| 2011/0125766 A1* | 5/2011 | Carozza ............... G06F 16/51 707/752 |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2011/0258225 A1 | 10/2011 | Taylor et al. |
| 2011/0307338 A1 | 12/2011 | Carlson |
| 2012/0054155 A1 | 3/2012 | Darcy |
| 2012/0076058 A1 | 3/2012 | Padmanabh et al. |
| 2012/0078848 A1 | 3/2012 | Jennas et al. |
| 2012/0079224 A1 | 3/2012 | Clayton et al. |
| 2012/0084414 A1 | 4/2012 | Brock et al. |
| 2012/0084789 A1 | 4/2012 | Iorio |
| 2012/0109892 A1 | 5/2012 | Novik et al. |
| 2012/0109935 A1 | 5/2012 | Meijer |
| 2012/0130988 A1 | 5/2012 | Nica et al. |
| 2012/0131278 A1 | 5/2012 | Chang et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0179833 A1 | 7/2012 | Kenrick et al. |
| 2012/0198200 A1 | 8/2012 | Li et al. |
| 2012/0215740 A1 | 8/2012 | Vaillant et al. |
| 2012/0215763 A1 | 8/2012 | Hughes et al. |
| 2012/0221540 A1 | 8/2012 | Rose et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0019296 A1 | 1/2013 | Brandenburg |
| 2013/0151477 A1 | 6/2013 | Tsaur et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1 | 12/2013 | Ananthanarayanan et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0180723 A1* | 6/2014 | Cote .................... G06Q 40/08 705/4 |
| 2014/0258343 A1 | 9/2014 | Nikula |

(56) References Cited

U.S. PATENT DOCUMENTS

| | | | |
|---|---|---|---|
| 2014/0279929 A1 | 9/2014 | Gupta et al. | |
| 2014/0280380 A1 | 9/2014 | Jagtap et al. | |
| 2015/0012797 A1* | 1/2015 | Leggette | G06F 11/1092 714/763 |
| 2015/0016300 A1* | 1/2015 | Devireddy | H04L 41/0893 370/254 |
| 2015/0074041 A1 | 3/2015 | Bhattacharjee et al. | |
| 2015/0081766 A1 | 3/2015 | Curtis et al. | |
| 2015/0242531 A1 | 8/2015 | Rodniansky | |
| 2015/0278295 A1 | 10/2015 | Merriman et al. | |
| 2015/0301901 A1 | 10/2015 | Rath et al. | |
| 2015/0331755 A1 | 11/2015 | Morgan | |
| 2015/0341212 A1 | 11/2015 | Hsiao et al. | |
| 2015/0378786 A1 | 12/2015 | Suparna et al. | |
| 2016/0005423 A1* | 1/2016 | Neppalli | G11B 5/09 360/25 |
| 2016/0048345 A1 | 2/2016 | Vijayrao et al. | |
| 2016/0110284 A1 | 4/2016 | Athalye et al. | |
| 2016/0110414 A1 | 4/2016 | Park et al. | |
| 2016/0162354 A1 | 6/2016 | Singhai et al. | |
| 2016/0162374 A1 | 6/2016 | Mutha et al. | |
| 2016/0188377 A1 | 6/2016 | Thimmappa et al. | |
| 2016/0203202 A1 | 7/2016 | Merriman et al. | |
| 2016/0246861 A1 | 8/2016 | Merriman et al. | |
| 2016/0306709 A1 | 10/2016 | Shaull | |
| 2016/0323378 A1 | 11/2016 | Coskun et al. | |
| 2016/0364440 A1 | 12/2016 | Lee et al. | |
| 2017/0032007 A1 | 2/2017 | Merriman | |
| 2017/0032010 A1 | 2/2017 | Merriman | |
| 2017/0091327 A1 | 3/2017 | Bostic et al. | |
| 2017/0109398 A1 | 4/2017 | Stearn | |
| 2017/0109399 A1 | 4/2017 | Stearn et al. | |
| 2017/0109421 A1 | 4/2017 | Stearn et al. | |
| 2017/0169059 A1 | 6/2017 | Horowitz et al. | |
| 2017/0262516 A1 | 9/2017 | Horowitz et al. | |
| 2017/0262517 A1 | 9/2017 | Horowitz et al. | |
| 2017/0262519 A1 | 9/2017 | Horowitz et al. | |
| 2017/0262638 A1 | 9/2017 | Horowitz et al. | |
| 2017/0264432 A1 | 9/2017 | Horowitz et al. | |
| 2017/0270176 A1 | 9/2017 | Horowitz et al. | |
| 2017/0286510 A1 | 10/2017 | Horowitz et al. | |
| 2017/0286516 A1 | 10/2017 | Horowitz et al. | |
| 2017/0286517 A1 | 10/2017 | Horowitz et al. | |
| 2017/0286518 A1 | 10/2017 | Horowitz et al. | |
| 2017/0322954 A1 | 11/2017 | Horowitz et al. | |
| 2017/0322996 A1 | 11/2017 | Horowitz et al. | |
| 2017/0344290 A1 | 11/2017 | Horowitz et al. | |
| 2017/0344441 A1 | 11/2017 | Horowitz et al. | |
| 2017/0344618 A1 | 11/2017 | Horowitz et al. | |
| 2017/0371750 A1 | 12/2017 | Horowitz et al. | |
| 2017/0371968 A1 | 12/2017 | Horowitz et al. | |
| 2018/0004801 A1 | 1/2018 | Burchall et al. | |
| 2018/0004804 A1 | 1/2018 | Merriman et al. | |
| 2018/0095852 A1 | 4/2018 | Keremane et al. | |
| 2018/0096045 A1 | 4/2018 | Merriman et al. | |
| 2018/0165338 A1 | 6/2018 | Kumar et al. | |
| 2018/0173745 A1 | 6/2018 | Balasubramanian et al. | |
| 2018/0300209 A1 | 10/2018 | Rahut | |
| 2018/0300381 A1 | 10/2018 | Horowitz et al. | |
| 2018/0314750 A1 | 11/2018 | Merriman et al. | |
| 2018/0343131 A1 | 11/2018 | George et al. | |
| 2018/0365114 A1 | 12/2018 | Horowitz | |
| 2019/0102410 A1 | 4/2019 | Horowitz et al. | |
| 2019/0303382 A1 | 10/2019 | Bostic et al. | |
| 2020/0097486 A1 | 3/2020 | Horowitz et al. | |
| 2020/0285549 A1 | 9/2020 | Horowitz et al. | |
| 2020/0295925 A1 | 9/2020 | Horowitz et al. | |
| 2020/0327021 A1 | 10/2020 | Horowitz et al. | |
| 2020/0341867 A1 | 10/2020 | Horowitz et al. | |

OTHER PUBLICATIONS

U.S. Appl. No. 15/654,590, filed Jul. 19, 2017, Horowitz et al.
U.S. Appl. No. 15/706,593, filed Sep. 15, 2017, Merriman et al.
U.S. Appl. No. 15/721,176, filed Sep. 29, 2017, Merriman et al.
U.S. Appl. No. 15/200,721, filed Jul. 1, 2016, Merriman.
U.S. Appl. No. 15/200,975, filed Jul. 1, 2016, Merriman.
U.S. Appl. No. 14/992,225, filed Jan. 11, 2016, Bostic et al.
U.S. Appl. No. 16/035,370, filed Jul. 13, 2018, Horowitz et al.
U.S. Appl. No. 15/605,512, filed May 25, 2017, Horowitz et al.
U.S. Appl. No. 15/605,143, filed May 25, 2017, Horowitz.
U.S. Appl. No. 15/605,391, filed May 25, 2017, Horowitz.
U.S. Appl. No. 15/390,345, filed Dec. 23, 2016, Stearn et al.
U.S. Appl. No. 15/390,351, filed Dec. 23, 2016, Stearn et al.
U.S. Appl. No. 15/390,364, filed Dec. 23, 2016, Stearn et al.
U.S. Appl. No. 15/604,879, filed May 25, 2017, Horowitz.
U.S. Appl. No. 15/604,856, filed May 25, 2017, Horowitz et al.
U.S. Appl. No. 15/605,141, filed May 25, 2017, Horowitz et al.
U.S. Appl. No. 15/605,276, filed May 25, 2017, Horowitz et al.
U.S. Appl. No. 15/605,372, filed May 25, 2017, Horowitz et al.
U.S. Appl. No. 15/605,426, filed May 25, 2017, Horowitz et al.
U.S. Appl. No. 15/627,502, filed Jun. 20, 2017, Horowitz et al.
U.S. Appl. No. 15/627,672, filed Jun. 20, 2017, Horowitz et al.
U.S. Appl. No. 16/013,345, filed Jun. 20, 2018, Horowitz.
U.S. Appl. No. 15/627,613, filed Jun. 20, 2017, Horowitz et al.
U.S. Appl. No. 15/627,631, filed Jun. 20, 2017, Horowitz et al.
U.S. Appl. No. 15/627,645, filed Jun. 20, 2017, Horowitz et al.
U.S. Appl. No. 15/627,656, filed Jun. 20, 2017, Horowitz et al.
U.S. Appl. No. 16/013,720, filed Jun. 20, 2018, Horowitz et al.
U.S. Appl. No. 16/013,725, filed Jun. 20, 2018, Merriman et al.
U.S. Appl. No. 16/890,948, filed Jun. 2, 2020, Merriman et al.
U.S. Appl. No. 16/887,092, filed May 29, 2020, Horowitz et al.
U.S. Appl. No. 16/883,653, filed May 26, 2020, Horowitz et al.
U.S. Appl. No. 16/912,963, filed Jun. 26, 2020, Horowitz et al.
[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].
Chang et al., Bigtable: a distributed storage system for structured data. OSDI'06: Seventh Symposium on Operating System Design and Implementation. Nov. 2006.
Cooper et al., PNUTS: Yahoo!'s hosted data serving platform. VLDB Endowment. Aug. 2008.
Decandia et al., Dynamo: Amazon's highly available key-value store. SOSP 2007. Oct. 2004.
Nelson et al., Automate MongoDB with MMS. PowerPoint Presentation. Published Jul. 24, 2014. 27 slides. http://www.slideshare.net/mongodb/mms-automation-mongo-db-world.
Poder, Oracle living books. 2009. <http://tech.e2sn.com/oracle/sql/oracle-execution-plan-operation-reference>.
Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.
Van Renesse et al., Chain replication for supporting high throughput and availability. OSDI. 2004: 91-104.
Walsh et al., Xproc: An XML Pipeline Language. May 11, 2011. <https://www.w3.org/TR/xproc/>.
Wikipedia, Dataflow programming. Oct. 2011. <http://en.wikipedia.org/wiki/Dataflow_programming>.
Wikipedia, Pipeline (Unix). Sept 2011. <http://en.wikipedia.org/wild/Pipeline (Unix)>.
Wilkins et al., Migrate DB2 applications to a partitioned database. developerWorks, IBM. Apr. 24, 2008, 33 pages.
Ongaro et al., In Search of an Understandable Consensus Algorithm. Proceedings of USENIX ATC '14: 2014 USENIX Annual Technical Conference. Philadelphia, PA. Jun. 19-20, 2014; pp. 305-320.
U.S. Appl. No. 16/294,227, filed Mar. 6, 2019, Bostic et al.
U.S. Appl. No. 16/525,447, filed Jul. 29, 2019, Horowitz et al.
U.S. Appl. No. 16/588,739, filed Sep. 30, 2019, Stearn et al.
U.S. Appl. No. 16/456,685, filed Jun. 28, 2019, Horowitz et al.

* cited by examiner

SYSTEMS AND METHODS FOR DATABASE ZONE SHARDING AND API INTEGRATION

RELATED APPLICATIONS

This Application is a Continuation-in-part of U.S. application Ser. No. 15/654,590, filed Jul. 19, 2017, entitled "SYSTEM AND METHOD FOR OPTIMIZING DATA MIGRATION IN A PARTITIONED DATABASE", which is a Continuation of U.S. application Ser. No. 13/078,104, filed Apr. 1, 2011, entitled "SYSTEM AND METHOD FOR OPTIMIZING DATA MIGRATION IN A PARTITIONED DATABASE". This application is a Non-Provisional of Provisional (35 USC 119(e)) of U.S. Application Ser. No. 62/522,222, filed Jun. 20, 2017, entitled "SYSTEMS AND METHODS FOR DATABASE API INTEGRATION AND ZONE SHARDING". This application is a Continuation-in-part of U.S. application Ser. No. 15/605,391, filed May 25, 2017, entitled "AGGREGATION FRAMEWORK SYSTEM ARCHITECTURE AND METHOD", which is a Non-Provisional of Provisional (35 USC 119(e)) of U.S. Application Ser. No. 62/341,511, filed May 25, 2016, entitled "AGGREGATION FRAMEWORK SYSTEM ARCHITECTURE AND METHOD". application Ser. No. 15/605,391 is a Non-Provisional of Provisional (35 USC 119(e)) of U.S. Application Ser. No. 62/341,490, filed May 25, 2016, entitled "AGGREGATION FRAMEWORK SYSTEM ARCHITECTURE AND METHOD". Application Ser. No. 15/605,391 is a Continuation-in-part of U.S. application Ser. No. 15/042,297, filed Feb. 12, 2016, entitled "AGGREGATION FRAMEWORK SYSTEM ARCHITECTURE AND METHOD", which is a Continuation of U.S. application Ser. No. 13/951,987, filed Jul. 26, 2013, entitled "AGGREGATION FRAMEWORK SYSTEM ARCHITECTURE AND METHOD", which is a Continuation-in-part of U.S. application Ser. No. 13/794,710, filed Mar. 11, 2013, entitled "AGGREGATION FRAMEWORK SYSTEM ARCHITECTURE AND METHOD", which is a Non-Provisional of Provisional (35 USC 119(e)) of U.S. Application Ser. No. 61/676,188, filed Jul. 26, 2012, entitled "AGGREGATION FRAMEWORK SYSTEM ARCHITECTURE AND METHOD". Application Ser. No. 15/605,391 is a Continuation-in-part of U.S. application Ser. No. 14/672,901, filed Mar. 30, 2015, entitled "AGGREGATION FRAMEWORK SYSTEM ARCHITECTURE AND METHOD", which is a Continuation of U.S. application Ser. No. 13/794,710, filed Mar. 11, 2013, entitled "AGGREGATION FRAMEWORK SYSTEM ARCHITECTURE AND METHOD". This application is a Continuation-in-part of U.S. application Ser. No. 15/074,987, filed Mar. 18, 2016, entitled "METHOD AND APPARATUS FOR MAINTAINING REPLICA SETS", which is a Continuation of U.S. application Ser. No. 14/064,705, filed Oct. 28, 2013, entitled "METHOD AND APPARATUS FOR MAINTAINING REPLICA SETS", which is a Continuation of U.S. application Ser. No. 12/977,563, filed Dec. 23, 2010, entitled "METHOD AND APPARATUS FOR MAINTAINING REPLICA SETS". This application is a Continuation-in-part of U.S. application Ser. No. 14/992,225, filed Jan. 11, 2016, entitled "DISTRIBUTED DATABASE SYSTEMS AND METHODS WITH PLUGGABLE STORAGE ENGINES", which is a Non-Provisional of Provisional (35 USC 119(e)) of U.S. Application Ser. No. 62/232,979, filed Sep. 25, 2015, entitled "DISTRIBUTED DATABASE SYSTEMS AND METHODS WITH PLUGABLE STORAGE ENGINES", each of which above referenced applications are herein incorporated by reference in their entirety.

BACKGROUND

Applications require continuous availability. As more organizations launch services online for consumption by global audiences, scalability across distributed geographic regions, applications, and clients become increasingly important considerations in systems design.

A plurality of cloud services are available to provide cloud services for applications and businesses to grow. Cloud services may offer compute power, database storage, applications, and other resources through a cloud services platform. Cloud service providers include Amazon Web Services, Google Cloud, and Microsoft Azure.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

SUMMARY

According to one aspect, systems and methods are provided to enable control and placement of data repositories. For example, the system enables users to define specific rules governing data placement in a database system (e.g., a sharded cluster or cloud distributed database). In some embodiments, a zone may comprise a segment of data in a database. For example, a zone may comprise a segment of data associated with a particular location, client, application, application feature, hardware configuration, or other characteristic. A website, for example, may need to segment data according to location. In this example, a zone may be created for North America and another zone may be created for Europe. Data related to transactions executed in North America, for example, can be placed in the North America zone and data related to transactions in Europe can be placed in the Europe zone. According to some embodiments, the system may use zones to accommodate a range of deployment scenarios. According to one embodiment, the system enables users to continuously refine data placement rules by modifying shard key ranges (e.g., shards are partitions of data defined by key ranges), and the system (e.g., MongoDB) can be configured to automatically migrate the data to its new zone based on newly defined key ranges.

According to some embodiments, the system can be configured to create zones of data based on a data key, primary key, and/or a shard key. In some embodiments, a shard may represent a subset of data of a database. In some embodiments, shards of data may be distributed across multiple machines. The system can be configured to associate each zone with one or more shards in the cluster. In some embodiments, the system can be configured to associate a shard with any number of non-conflicting zones. In some embodiments, a database may maintain a balanced cluster, i.e. a cluster in which data is distributed substantially evenly among subsets. In one implementation, the subsets may comprise shards and a balanced database cluster may have data distributed substantially evenly among the shards to maintain a balanced cluster. In some embodiments, in a balanced cluster, the system can be configured to migrate chunks covered by a zone only to those shards associated with the zone.

In some embodiments, the system can be configured to utilize zones to enable deployment patterns. In some embodiments, the system can be configured to isolate a specific subset of data on a specific set of shards. For example, the system can be configured to use zones to isolate data and/or operations associated with a first entity (e.g., an application or user) on a first set of shards and isolate data associated with a second entity (e.g., an application or user) on a second set of shards different from the first set of shards. In some embodiments, the system can be configured to use zones to ensure that the most relevant data reside on shards that are geographically closest to the application servers. For example, the system can be configure to designate shards to specific zones that are associated with a geographic location. Those shards may be stored in data centers that are geographically closest to the application servers. In some embodiments, the system can be configured to use zones to route data and/or operations to shards based on hardware and/or performance. For example, the system can be configured to use zones to designate shards that meet a first level of performance (e.g., higher speed data reads/writes) and shards that meet a second level of performance (e.g., lower speed data reads/writes) which may be lower than the first level of performance. Data and/or operations can be routed to one or more shards of a particular zone based on a required level of performance. Some embodiments can use zones to enable other deployment patterns. Example deployment patterns are discussed herein.

According to some embodiments, a database system (e.g., MongoDB Atlas) is provided that can support a plurality of cloud services from a plurality of cloud service providers. In one example, the cloud based database system can include versions of the known MongoDB database implemented on cloud resources or span both local and cloud resources. End users can interact with a website (e.g., MongoDB website) to order or specify database parameters. In some embodiments, the system can limit the needed information to a small set of configuration features that are used with template or pre-configured architectures to provide a cloud instantiated database in a short period of time and with minimal user input. The system can be configured to provision any needed resources (e.g., Amazon Web Services (AWS) API, Google API, Azure API) and install software, builds, etc. The software may include, for example, automation agents and/or monitoring agents for automating functions. By provisioning the needed resources in the cloud, the system may provide a fully functional database without any hardware requirement on the end user beyond an internet connection. In some embodiments, the system can be configured to integrate any of Google Cloud resources, AWS resources, and Azure Cloud resources.

According to one aspect, a database system is provided. The database system comprises: a plurality of shards storing a plurality of data items; at least one processor configured to: generate a plurality of zones including a first zone and a second zone, the generating comprising: associating a first one of the plurality of shards with the first zone; and associating a second one of the plurality of shards with the second zone; mapping a first set of the plurality of data items to the first zone; in response to mapping the first set of data items to the first zone, storing the first set of data items in the first shard; mapping a second set of the plurality of data items to the second zone; and in response to mapping the second set of data items to the second zone, storing the second set of data items in the second shard.

According to one embodiment, the at least one processor is configured to associate the first zone with a first datacenter and the second zone with a second datacenter. According to one embodiment, the first shard comprises a plurality of nodes and the at least one processor is configured to store a majority of the plurality of nodes in the first datacenter.

According to one embodiment, generating the plurality of zones comprises: mapping the first zone to a first range of key values; and mapping the second zone to a second range of key values. According to one embodiment, mapping the first set of data items to the first zone comprises determining that a shard key value of each of the first set of data items is in the first range of key values; and mapping the second set of data items to the second zone comprises determining that a shard key value of each of the second set of data items is in the second range of key values. According to one embodiment, the first range of shard key values and the second range of shard key values are mutually exclusive.

According to one embodiment, the at least one processor is configured to: generate a first tag for the first zone and a second tag for the second zone; and associate the first shard with the first tag and the second shard with the second tag.

According to one embodiment, the at least one processor is configured to associate the first zone with a first geographic location and the second zone with a second geographic location. According to one embodiment, the database system further comprises a routing service, executed by the at least one processor, configured to: map the first set of data items to the first zone in response to determining an association of the first set of data items with the first geographic location; and map the second set of data items to the second zone in response to determining an association of the second set of data items with the second geographic location.

According to one embodiment, the at least one processor is configured to associate the first zone with a first application and the second zone with a second application.

According to another aspect, a computer-implemented method of storing data in a database is provided. The method comprises: storing a plurality of data items in a plurality of shards; generating a plurality of zones including a first zone and a second zone, the generating comprising: associating a first of the plurality of shards with the first zone; and associating a second one of the plurality of shards with the second zone; mapping a first set of the plurality of data items to the first zone; in response to mapping the first set of data items to the first zone, storing the first set of data items in the first shard; mapping a second set of the plurality of data items to the second zone; and in response to mapping the second set of data items to the second zone, storing the second set of data items in the second shard.

According to one embodiment, the method further comprises routing a new data item for storage to the first shard in response to mapping the new data item to the first zone.

According to one embodiment, the method further comprises associating the first zone with a first datacenter and the second zone with a second datacenter. According to one embodiment, the method further comprises: storing a majority of nodes of the first shard in the first datacenter; and storing the first set of data items in the first datacenter.

According to one embodiment, the method further comprises: generating a first range of key values for the first zone; and generating a second range of key values for the second zone; wherein mapping the first set of data items to the first zone comprises determining that each of the first set of data items has a shard key value within the first range; and wherein mapping the second set of data items to the second zone comprises determining that each of the second set of data items as a shard key value within the second range.

According to one embodiment, the method further comprises generating the first range of key values mutually exclusive from the second range of key values.

According to one embodiment, the method further comprises: generating a first tag for the first zone and a second tag for the second zone; mapping the first shard to the first tag; and mapping the second shard to the second tag.

According to one embodiment, the method further comprises: routing a new data item for storage to the first shard in response to determining association of the new data item with a first geographic location; and routing the new data item for storage to the second shard in response to determining association of the new data item with the second geographic location.

According to another aspect, at least one non-transitory computer-readable storage medium storing instructions is provided. The instructions, when executed by at least one processor, cause the at least one processor to perform a method comprising: storing a plurality of data items in a plurality of shards; generating a plurality of zones including a first zone and a second zone, the generating comprising: associating a first of the plurality of shards with the first zone; and associating a second of the plurality of shards with the second zone; mapping a first set of the plurality of data items to the first zone; in response to mapping the first set of data items to the first zone, storing the first set of data items in the first shard; mapping a second set of the plurality of data items to the second zone; and in response to mapping the second set of data items to the second zone, storing the second set of data items in the second shard.

According to one embodiment, the method further comprises: generating a first range of key values for the first zone; and generating a second range of key values for the second zone; wherein mapping the first set of data items to the first zone comprises determining that each of the first set of data items has a shard key value within the first range; and wherein mapping the second set of data items to the second zone comprises determining that each of the second set of data items as a shard key value within the second range.

According to another aspect, a database management system is provided. The database management system comprises: a distributed database comprising a plurality of shards storing a plurality of data items; at least one processor configured to: determine a first range of shard key values; analyze operations on the distributed database and select a target shard to optimize a system hosting the target shard or portion of the target shard for storage of data associated with the first range of shard key values; map the first range of shard key values to the target shard or portion of the target shard: route a first data item to the target shard or portion of the target shard, wherein the act of routing comprises: mapping the first data item to the first range of shard key values; and responsive to the mapping, storing the first data item in the target shard or portion of the target shard.

According to one embodiment, the database system further comprises a first datacenter and a second datacenter and the at least one processor is configured to: host a first node of the target shard or portion of the target shard on the first datacenter; and host a second node of the target shard or portion of the target shard on the second datacenter. According to one embodiment, the at least one processor is configured to: route an operation to the first node when the first datacenter is operational; and route the operation to the second node when the first datacenter is not operational. According to one embodiment, the first datacenter is located in a first geographic region and the second datacenter is located in a second geographic region; the first node is a primary node of the target shard or portion of the target shard and the second node is a secondary node of the target shard or portion of the target shard; and the at least one processor is configured to: determine that a majority of write requests over a period of time originated from the second geographic region and, in response, trigger an election setting the second node to the primary node of the target shard or portion of the target shard.

According to one embodiment, the first datacenter is located in a first geographic region and the second datacenter is located in a second geographic region; the first node is a primary node of the target shard or portion of the target shard and the second node is a secondary node of the target shard or portion of the target shard; and the at least one processor is configured to: determine that a majority of read requests over a period of time originated from the first geographic region and, in response, trigger an election setting the first node to a secondary node of the target shard or portion of the target shard. According to one embodiment, the first datacenter is located in a first geographic region and the second datacenter is located in a second geographic region, and the at least one processor is configured to: route an operation associated with the first geographic region to the first node hosted by the first datacenter; and route an operation associated with the second geographic region to the second node hosted by the second datacenter.

According to one embodiment, the database system further comprises storage hardware that provides a first level of performance and storage hardware that provides a second level of performance, wherein the at least one processor is configured to: store the target shard or portion of the target shard on the storage hardware that provides the first level of performance; determine that an operation requires the first level of performance; and route the operation to the target shard or portion of the target shard in response to determining that the operation requires the first level of performance. According to one embodiment, the at least one processor is configured to: determine that a threshold number of data items stored on the target shard or portion of the target shard are to be accessible with the second level of performance and, in response, migrate the target shard or portion of the target shard to the storage hardware that provides the second level of performance for storage. According to one embodiment, the at least one processor is configured to: determine that the threshold number of data items stored on the target shard or portion of the target shard are to be accessible with the second level of performance based on times that at least some of the data items were generated.

According to another aspect, a computer-implemented method of managing a distributed database is provided. The method comprises: storing a plurality of data items among a plurality of shards in the distributed database; determining a first range of key values; analyzing operations on the distributed database and selecting a target shard or portion of a target shard to optimize a system hosting the target shard or portion of the target shard for storage of data associated with the first range of shard key values; mapping the first range of shard key values to the target shard or portion of the target shard: outing a first data item to the target shard or portion of the target shard, wherein the act of routing comprises: mapping the first data item to the first range of shard key values; and responsive to the mapping, storing the first data item in the target shard or portion of the target shard.

According to one embodiment, the method further comprises: hosting a first node of the target shard or portion of the target shard on a first datacenter; and hosting a second node of the target shard or portion of the target shard on a second datacenter. According to one embodiment, the method further comprises: routing an operation to the first node when the first datacenter is operational; and routing the operation to the second node when the first datacenter is not operational. According to one embodiment, the first datacenter is located in a first geographic region and the second datacenter is located in a second geographic region; and the method further comprises: setting the first node as a primary node of the target shard or portion of the target shard and the second node as a secondary node of the target shard or portion of the target shard; and determining that a majority of write requests over a period of time originated from the second geographic region and, in response, triggering an election setting the second node to the primary node of the target shard or portion of the target shard.

According to one embodiment, the first datacenter is located in a first geographic region and the second datacenter is located in a second geographic region; and the method further comprises acts of: setting the first node as a primary node of the target shard or portion of the target shard and the second node as a secondary node of the target shard or portion of the target shard; and determining that a majority of read requests over a period of time originated from the first geographic region and, in response, triggering an election setting the first node to a secondary node of the target shard or portion of the target shard. According to one embodiment, the first datacenter is located in a first geographic region and the second datacenter is located in a second geographic region, and the method further comprises acts of: routing an operation associated with the first geographic region to the first node hosted by the first datacenter; and routing an operation associated with the second geographic region to the second node hosted by the second datacenter.

According to one embodiment, the method further comprises: storing data in storage hardware that provides a first level of performance and data in storage hardware that provides a second level of performance; storing the target shard or portion of the target shard on the storage hardware that provides the first level of performance; determining that an operation requires the first level of performance; and routing the operation to the target shard or portion of the target shard in response to determining that the operation requires the first level of performance. According to one embodiment, the method further comprises determining that a threshold number of data items stored on the target shard or portion of the target shard are to be accessible with the second level of performance and, in response, migrating the target shard or portion of the target shard to the storage hardware that provides the second level of performance.

According to another aspect, at least one non-transitory computer-readable storage medium storing instructions is provided. The instructions, when executed by at least one processor, cause the at least one processor to perform a method comprising: storing a plurality of data items among a plurality of shards in the distributed database; determining a first range of key values; analyzing operations on the distributed database and selecting a target shard or portion of the target shard to optimize a system hosting the target shard or portion of the target shard for storage of data associated with the first range of shard key values; mapping the first range of shard key values to the target shard or portion of the target shard: routing a first data item to the target shard or portion of the target shard, wherein the act of routing comprises: mapping the first data item to the first range of shard key values; and responsive to the mapping, storing the first data item in the target shard or portion of the target shard.

According to one embodiment, the method further comprises: hosting a first node of the target shard or portion of the target shard on a first datacenter located in a first geographic region; hosting a second node of the target shard or portion of the target shard on a second datacenter located in a second geographic region; setting the first node as a primary node of the target shard or portion of the target shard and the second node as a secondary node of the target shard or portion of the target shard; and determining that a majority of write requests over a period of time originated from the second geographic region and, in response, triggering an election setting the second node to the primary node of the target shard or portion of the target shard.

According to one embodiment, the method further comprises: hosting a first node of the target shard or portion of the target shard on a first datacenter located in a first geographic region; hosting a second node of the target shard or portion of the target shard on a second datacenter located in a second geographic region; setting the first node as a primary node of the target shard or portion of the target shard and the second node as a secondary node of the target shard or portion of the target shard; and determining that a majority of read requests over a period of time originated from the first geographic region and, in response, triggering an election setting the first node to a secondary node of the target shard or portion of the target shard.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
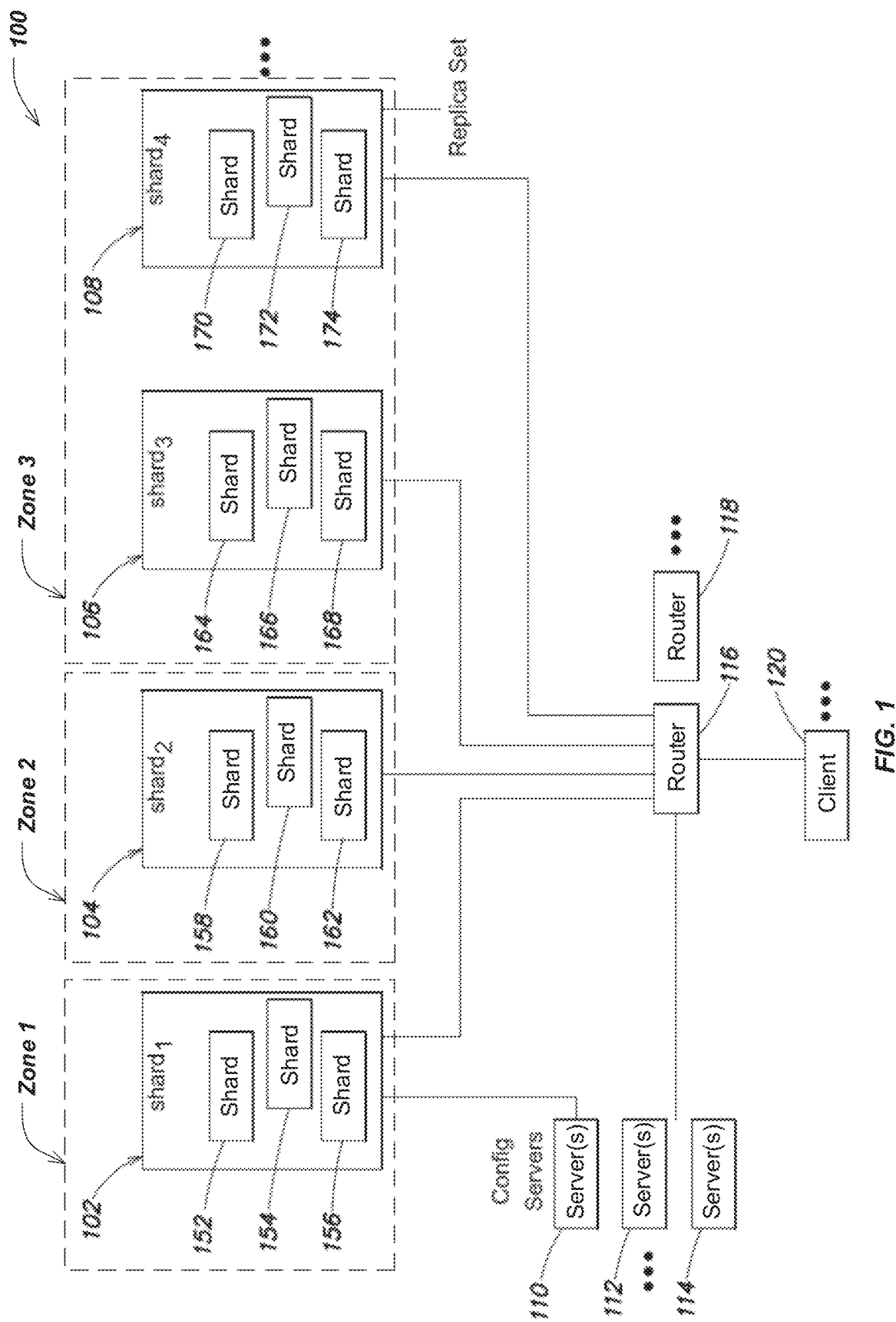
FIG. 1 shows a block diagram of an example architecture for a database management system, according to one embodiment.

According to one aspect, zone sharding techniques are provided. In some embodiments, zone sharding techniques may comprise methods by which data in a database can be segmented. For example, data can be segmented by geographic location, application, client, hardware, or other shared characteristic(s). In some embodiments, zone sharding provides the ability for users to define specific rules governing data placement in a sharded cluster. Zones accommodate a range of deployment scenarios—for example locating data by geographic region, by hardware configuration for tiered storage architectures, or by application feature. In some embodiments, administrators can continuously refine data placement rules by modifying shard key ranges, and the system can be configured to automatically migrate the data to its new zone.

Software applications may require continuous availability. As more organizations launch services online for consumption by global audiences, availability and scalability for different geographic regions, applications, hardware requirements, performance requirements, and other factors become increasingly important considerations in systems design. For example, three reasons for geographic distribution of databases across multiple data centers are:

1. Continuous Availability: Whether the database is deployed on-premise or in a public cloud, the business needs assurance that the service can survive a regional disaster that causes a complete data center outage. Examples include fires, floods or hurricanes. Gartner estimates downtime costs a business an average of $300,000 per hour, with losses much higher for global, internet-based operations.
2. Customer Experience: Global audiences need consistent, low latency experiences, wherever they are located. Amazon famously concluded that each 100 ms in added latency resulted in a 1% loss of sales.
3. Regulatory Compliance: National governments are placing controls on where customer data is physically located. That data is not allowed to be stored outside of it's country's borders.

In some embodiments, administrators may pin specific partitions of their database to specific geographic regions. In some embodiments a zone is part of the same, single cluster and can be queried globally, but data resides in the correct location based on sovereignty and local access requirements. In some embodiments, sovereignty may comprise designation of a particular zone as corresponding to a particular geographic location, application feature, client, or other characteristic. For example, a zone can be designated for North America. In some embodiments, access to data in the zone may be limited by local access requirements. For example, an application running on a device in a particular geographic location can be configured to access data from the zone designated for that geographic location. By associating data to shards based on user location, administrators are able to maintain low latency access.

For example, an application may have users in North America, Europe, and China. In some embodiments, the application owner can assign each shard to a zone representing the physical location (North America, Europe, or China) of that shard's servers, and then map all data items to the correct zone based on its region field. Any number of shards can be associated with each zone, and each zone can be scaled independently of the others—for instance, accommodating faster user growth in China than North America.

In some embodiments, a shard may be localized to a specific data center. Each data center has a primary replica member for its shard and also maintains secondary replica members for shards located in other data centers. Applications can perform local read and write operations of their data, and local read operations for the data replicated from other regions. If a user moves from one data center to another, their data can be moved easily by simply updating the shard zone.

According to one aspect, mobile applications where a user is roaming in a different region from the user's home location represent a typical use case for this type of deployment. Using the appropriate write concern policy, any updates to their mobile service can be routed back to their usual home location data center (write globally) while their reads are routed to their closest physical data center by using the nearest read preference (read locally).

According to another aspect, zone sharding may be utilized for content management and delivery. For example, the McAfee Global Threat Intelligence platform writes content updates to the data centers physically closest to each of their customers who then have low latency access to that data using the nearest read preference.

Some embodiments provide a solution for continuous availability of insert-only workloads such as the ingestion of sensor data in Internet of Things (IoT) applications. Zones can be used to create configurations specifically for localized writes in a distributed cluster, ensuring there is always a node available to accept inserts, even during a data center failure.

In some embodiments, in sharded clusters, zones may be created from sharded data based on the shard key. In some embodiments, the system can be configured to associate each zone with one or more shards in the cluster. A shard can associate with any number of non-conflicting zones. In one embodiment, in a balanced cluster, MongoDB migrates chunks covered by a zone only to those shards associated with the zone. Some examples where zoning can be applied:

1. Isolate a specific subset of data on a specific set of shards.
2. Ensure that the most relevant data resides on shards that are geographically closes to the application servers.
3. Route data to shards based on the hardware/performance of the shard hardware.

In some embodiments, a database system is provided that stores portions of a database among multiple zones. The database system can be configured to associate different portions of the database with different zones. The system can be configured to map one or more data items to one or more of the multiple zones. Based on the mapping, the system can be configured to route the data item(s) to one or more portions of the database that are associated with the zone(s) to which the data items were matched. In some embodiments, the database system can be configured to map zones to a respective set of key values. In some embodiments, the set of key values may be a range of key values. The database system can be configured to map the data item(s) to one or more zones by mapping key values associated with the data item(s) to one or more ranges of key values associated with the zone(s).

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 shows a block diagram of an example architecture for a managed database system 100 that employs zone sharding, according to some embodiments of the present invention. The managed database system 100 has been specially configured as a shard cluster. The shard cluster is the grouping of shards that collectively represent the data within the database. A shard cluster typically comprises multiple shard servers (e.g., 102-108) hosting multiple partitions (e.g., 152-174) or shards of data. The shards of the shard cluster can be associated with different zones. For example, as illustrated in FIG. 1, shards 152-156 can be associated with zone 1, shards 158-162 can be associated with zone 2, and shards 164-174 can be associated with zone 3. The managed database system 100 can include one or more configuration servers (e.g., 110-114) for metadata management, and shard router processes (e.g., 116-118). Metadata for the shard cluster can include, for example, information on a zone that each shard is associated with, information on the ranges of data stored in each partition, information associated with managing the shard cluster, partition counts, number of shard servers, data index information, partition size constraints, data distribution thresholds, among other options.

In some embodiments, each shard of data (e.g., 152-174) can be configured to reside on one or more servers executing database operations for storing, retrieving, managing, and/or updating data. In some embodiments, a shard server 102 contains multiple partitions of data which can also be referred to as "chunks" of database data. In some embodiments, a shard of data corresponds to a chunk of data. A chunk is also a reference to a partition of database data. A chunk can be configured as a contiguous range of data from a particular collection in the database. In some embodiments, collections are logical organizations of subsets of database data. In some embodiments, a collection can comprise one or more documents. A document can comprise a unit of data storage. The document can include one or more fields and one or more values stored in the field(s). In one example, a collection of documents is a named grouping of the data, for example, a named grouping of documents. The named grouping can be homogenous or heterogeneous. In some embodiments, collections are organizations of database data similar to relational database tables.

In some embodiments, configurations within a shard cluster can be defined by metadata associated with the managed database referred to as shard metadata. Shard metadata can include information about a zone association of one or more shards, collections within a given database, the number of collections, data associated with accessing the collections, database key properties for a given collection, ranges of key values associated with a given partition, shard, and/or chunk of data within a given collections, to provide some examples.

In some embodiments, the database system 100 can associate shards with one or more zones (e.g., zones 1-3). In some embodiments, a respective shard can be associated with one or more zones. In some embodiments, a server can be configured to store data in one or more specific shards based on association of the shard(s) with particular zones. In some embodiments, a zone can be used to group data according to a shared attribute. Zones may be used to isolate a subset of data to a specific set of shards. For example, one or more zones can be used to store data on shards that are geographically close to one or more servers of an application that uses the data. The zone(s) may be defined according to one or more geographic regions, and one or more shards that are in the geographic region(s) may be associated with those zone(s). The server(s) may store, modify, and/or read data from the database system. By isolating the data to the shard(s) in the zone(s), the database system minimizes delays in database operations for the application server(s). In another example, one or more zones can be used to store data on one or more shards based on a hardware and/or performance of the shards. one set of data may require a first level of performance, while a second set of data my require a second level of performance. Accordingly, a first set of shards that provide the first level of performance can be associated with a first zone, and a second set of shards that provide the second level of performance can be associated with a second zone. Data can be stored in shards of a particular zone based on a required level of performance for the data. For example, data that is accessed more frequently can be stored in the first zone that offers a higher level of performance while data that is accessed less frequently can be stored in the second zone that offers a lower level of performance. Examples implementations of zones are discussed herein.

In some embodiments, establishing an appropriate shard key facilitates the efficient management of data within the shard cluster. To partition a collection, a shard key pattern can be specified. The shard key pattern, in some embodiments, can be similar to the key pattern used to define an index. The shard key pattern establishes one or more fields to define the shard key upon which the managed database can distribute data. In some embodiments, the shard key pattern can be input through a management process. The shard key pattern can be predefined and/or dynamically generated. Once established, the shard key pattern can be used to control the partitioning of data. The data can be partitioned in chunks of data. A shard of data can be a chunk. The chunks of data are typically constructed of contiguous ranges of data. According to one embodiment, the congruous range of data is defined based on database key values or database key patterns used associated with the data. In some examples, chunks are defined by a triple (collection, minKey, and maxKey). A given chunk can be configured with a named for the collection to which the chunk belongs corresponding to collection in the triples and a range of key values that defined the beginning and the end of the data found within the chunk corresponding to minKey and maxKey. In one example, the shard key K associated with a given document within a collection assigns that document to the chunk where the value for K falls within the values defined by minKey and maxKey. Thus, the shard database key/shard database key pattern defines the ranges of data found within a given chunk. The shard key ranges associated with a given partition can be used by the shard cluster (e.g. through a router process) to direct database requests to appropriate shard servers hosting the particular partition.

In some implementations, the maximum size can be predetermined. In some embodiments, the maximum size can be dynamically established. In some embodiments, a maximum size of 200 Mb establishes a good threshold that balances the costs of sharding (e.g., the computational burden associated with the copying/moving of the data and the versioning the chunks) against the improvement in processing by having sharded data. Some embodiments support compound shard keys/shard key patterns.

In some embodiments, the shard key should be selected to insure they are granular enough to provide for an even distribution of data. For instance, when a shard key is based on name, the database can be checked to insure there are not a disproportionate number of users with the same name. In such a case, an individual chunk can become too large and further, because of the key selected, be unable to split. In some implementations, logic can be implemented within the shard cluster to assist in selecting of the shard key. Distributions can be established and analyzed, for example during a testing phase, to insure that key does not invoke disproportionate distributions. For example, where the entire range comprises just a single key on name and a disproportionate number of users share the same name, it can become impossible to split chunks of the data without creating a new shard key. Thus, for a database where it is possible that a single value within a shard key range might grow exceptionally large, a compound shard key can be constructed that enables further discrimination of the values that a single key selection.

In some embodiments, the database system 100 can be configured to create zones of sharded data using shard keys. The database system 100 can be configured to designate specific ranges of keys for specific zones. In some embodiments, a zone can cover one or more ranges of shard key values. Data can be stored in a particular zone based on a key value associated with the data. In some embodiments, zones cannot share ranges, nor can they overlap ranges. The system 100 can be configured to store an association of a shard with one or more zones. As a result, the shard can be allowed to store data associated with that zone. For example, zone 1 can be configured to cover a first range of shard key values. Shards 152-156 can be associated with zone 1. The configuration server(s) (e.g., one or more of servers 110-114) can be configured to store metadata specifying that shards 152-156 are to be associated with zone 1. Data that is designated for zone 1 (e.g., by one or more key values in the first range) may then be stored in shards 152-156 of zone 1. Zone 2 can be configured to cover a second range of shard key values. Shards 158-168 can be associated with zone 1 (e.g., by the configuration server(s) 110-114). Data that is designated for zone 2 (e.g., by one or more key values in the second range) may then be stored in shards 158-168.

In some embodiments, a shard can be associated with multiple zones. For example, the configuration server(s) 110-114 can be configured to store an association of a respective shard with more than one zone. In some embodiments, one or more shards may not be associated with any zone. Data that is not designated for a particular zone may be stored in the shard(s) not associated with a zone.

In some embodiments, a chunk of a data can also be associated with a maximum size threshold which defines that maximum size a given chunk can reach before a splitting operations is performed on the data within the chunk. In some embodiments, once the data within a given chunk reaches the maximum size, a managed database or a shard cluster can be configured to automatically generate a new chunk having its own range of contiguous data. In some examples, the data within the original chunk is split, approximately half the data remaining in the original chunk and approximately half the data being copied into the new created chunk. Although in some embodiments, the split can occur so that different portions of data remain in the original chunk and/or are copied into the new chunk.

In some embodiments, sharding of the database in data chunks, that is the partitioning of the data in the database, occurs based on database collections rather than the database as a whole. For example, when implementing a database management system for a service like the well-known TWITTER service, it is appreciated that the collection of "tweets" or messages within the database of the TWITTER service would be several orders or magnitude larger than the next largest collection. The size and throughput associated with the collection of tweets would be ideal for sharding, whereas smaller collections can be configured to reside on a single server. In some implementations, the data within the database is organized into documents. Some examples of document organization formats include the known JSON (JavaScript Object Notation) and BSON (binary encoded serialization of JSON) formatting for documents. BSON is a binary format in which zero or more key/value pairs are stored as a single entity. The BSON entity can be referred to as a document. In some examples, BSON is designed to be efficient in space, but in many cases is not much more efficient than JSON. In some cases BSON can employ more space than JSON to encode information. In one embodiment, this results from on e of the BSON design goals: traversability. In some examples, BSON adds some additional information to documents, like length prefixes, that make it the document easier and faster to traverse. BSON is also designed to be fast to encode and decode. For example, integers are stored as 32 (or 64) bit integers, so they don't need to be parsed to and from text. This uses more space than JSON for small integers, but is much faster to parse.

Returning to FIG. 1, the three dots illustrated next to the system components indicate that the system component can be repeated. In some embodiments, adding additional shards, configuration servers, and/or shard routing processes can increase the capacity of the managed database system. The shard router processes 116-118 handle incoming requests from clients 120 (e.g., applications, web services, user initiated requests, application protocol interfaces, etc). The router processes 116-118 are configured to provide a transparent interface to handle database requests. In particular, client 120 need not know that a database request is being served by a sharded database. The shard router processes receive such client requests and route the database requests to the appropriate shard(s), e.g., 152-174 on shard servers 102-108.

In some embodiments, a router process, e.g., 116, can be configured to operate as a routing and coordination process that makes the various components of the cluster look like a single system, for example, to client 120. In response to receiving a client request, the router process 116 routes the request to the appropriate shard or shards. The shard(s) return any results to the router process. The router process 116 can merge any results and communicate the merged result back to the client 120. In some examples, the router process 116 is also configured to establish current state information for the data distributed throughout the database by requesting metadata information on the database from the configuration server(s) 110-114. The request for metadata information can be executed on startup of a routing process. Further requests can be initiated by the routing process and/or can be initiated by a configuration server. In one example, a change at the configuration server can trigger a distribution of updates to any routing processes.

In some embodiments, any changes that occur on the configuration server(s) can be propagated to each router process 116-118, as needed. In one example, router processes 116-118 can be configured to poll the configuration servers(s) 110-114 to update their state information periodically. In others examples, router processes can be configured to poll the configuration servers(s) 110-114 to update their state information on a schedule, periodically, intermittently, and can be further configured to received updates pushed from the configuration server(s) 110-114 and/or any combination of thereof. According to one embodiment, the router processes capture metadata information on the shard cluster stored at the configuration servers. In some examples, the metadata information includes information on the data stored in the database, how the data is partitioned, version information associated with the partitions, database key values associated with partitions, etc. According to some embodiments, the router process 116 can be configured without persistent state information. For example, at initiation the router process 116 cannot fully route data requests until its state is updated with the metadata describing the distribution of data throughout the shards.

In some embodiments, router processes can run on any server within the managed database and/or on any number of server(s) that is desired. For example, the router processes can be executed on stand-alone systems, and in other examples the router processes can be run on the shard servers themselves. In yet other examples, the router processes can be run on application servers associated with the managed database. Under typical installations, there are no limits on the number of router processes that can be invoked. The addition of routing processes can permit the managed database to route greater number of requests to the appropriate shards of data. In some embodiments, additional routing process can enable additional client connections to the partitioned database. In other embodiments, additional routing processes can facilitate management of the distribution of data within the database.

In some embodiments, each router process can be configured to act independently of any other routing processes being executed within the managed database. In some examples, the router processes do not coordinate processing, rather each router process can be configured to act independently. In some environments, this property enables unlimited numbers of router processes with virtually no additional complexity, as all the router processes receive their state information from the configuration servers and no coordination between the router processes is required for routing data requests.

In some embodiments, configuration server(s) 110-114 are configured to store and manage the database's metadata. In some embodiments, the metadata includes basic information on each shard in the shard cluster including, for example, network communication information, zone information, server information, number of chunks of data, chunk version, number of shards of data, shard version, and other management information for routing processes, database management processes, chunk splitting processes, etc. According to some embodiments, chunk information can be the primary data stored by the configuration server(s) 110-116. In some examples, chunks are defined by a triple (collection, minKey, and maxKey) and the metadata stored on the configuration servers establishes the relevant values for a given chunk of data.

In some embodiments, each of the installed configuration server(s) has a complete copy of all the chunk metadata information for the managed database. According to one aspect, various replication strategies can be implemented to maintain consistency between configuration servers. In some embodiments, updates to configuration data stored on the configuration server can require additional processes for insuring consistency. For example, a two-phase commit operation, is used to ensure the consistency of the configuration data amongst the configuration servers. In another example, various atomic commitment protocols (ACP) are used to insure consistency of the database metadata on any configuration servers.

Figure 2:
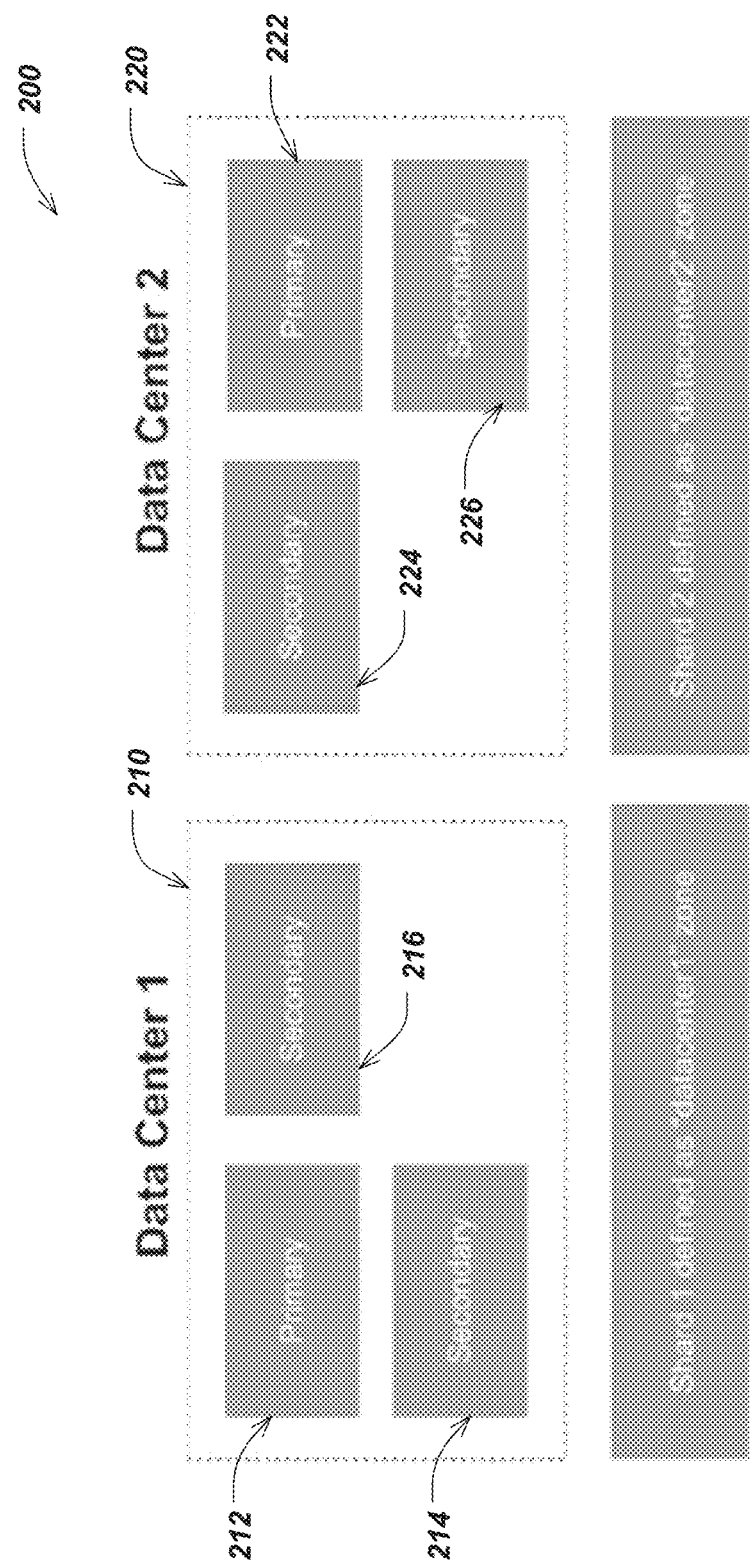
FIG. 2 shows a block diagram of an example of two data centers configured as two separate zones, according to one embodiment.

FIG. 2 illustrates an example zone topology 200 of two data centers 210, 220, in accordance with some embodiments of the technology described herein. The topology 200 includes a first data center 210 and a second data center 220. The first data center 210 hosts (1) a primary node 212 of a first shard associated with zone 1 (e.g., the "datacenter1" zone), (2) a secondary node 214 of the first shard, and (3) a secondary node 216 of a second shard associated with zone 2 (e.g., the "datacenter2" zone). The second data center 220 hosts (1) a primary node 222 of the second shard associated with zone 2, (2) a secondary node 226 of the second shard, and (3) a secondary node 224 of the first shard. In some embodiments, a shard may be associated with a particular zone based on the datacenter that hosts a majority of the members (e.g., nodes) of the shard. For example, as illustrated in the topology 200, the first shard is associated with the first datacenter zone as the first datacenter 210 hosts a majority of the nodes of the first shard. Similarly, the second shard is associated with the second datacenter zone as the second datacenter 220 hosts a majority of the members of the second shard.

In some embodiments, the first zone can represent the first data center 210 as the primary node 212 of the first shard associated with the first zone is in the first data center 210. The second zone can represent the second data center 220 as the primary node of the second shard associated with the second zone is on the second data center 220. In some embodiments, as illustrated by topology 200, the database system can be configured to maintain nodes from both shards in each data center. Maintaining nodes of other zones on a data center can provide more robust availability. For example, in case the first data center 210 is unavailable, the system can automatically redirect data operations to a secondary node on the second data center 220.

In some embodiments, each shard may be localized to a specific data center. Each data center has a primary replica member for its shard and also maintains secondary replica members for shards located in other data centers. By doing so, the topology 200 provides database operation for an application across multiple different data centers. In some embodiments, applications can perform local read and write operations of their data, and local read operations for the data replicated from other regions. For example, if a user moves from a location associated with the first data center 210 to a location associated with the second data center 220, the user's data can be moved easily by simply updating the shard zone association of the user data. When the user's data is to be moved from the first data center 210 to the second data center 220, the zone association of the data can be updated (e.g., by changing a zone that a shard of data is associated with). In another example, an application used by a user on a client device (e.g., a mobile device) may be associated with the first shard associated with the first zone for which the primary node is on the first data center 210. The user, however, may be using the application in a different region from the user's home location associated with the second data center 220. The second data center 220 may then interact with the application to perform database operations (e.g., read, write, update, and/or delete). Using the shard zone associations, updates to the user's data made in the second data center 220 can be routed back to the home first data center 210 (e.g., using a write global command) while the reads can be routed to the second data center 220 by using a nearest read preference (e.g., a read local command).

Figure 3:
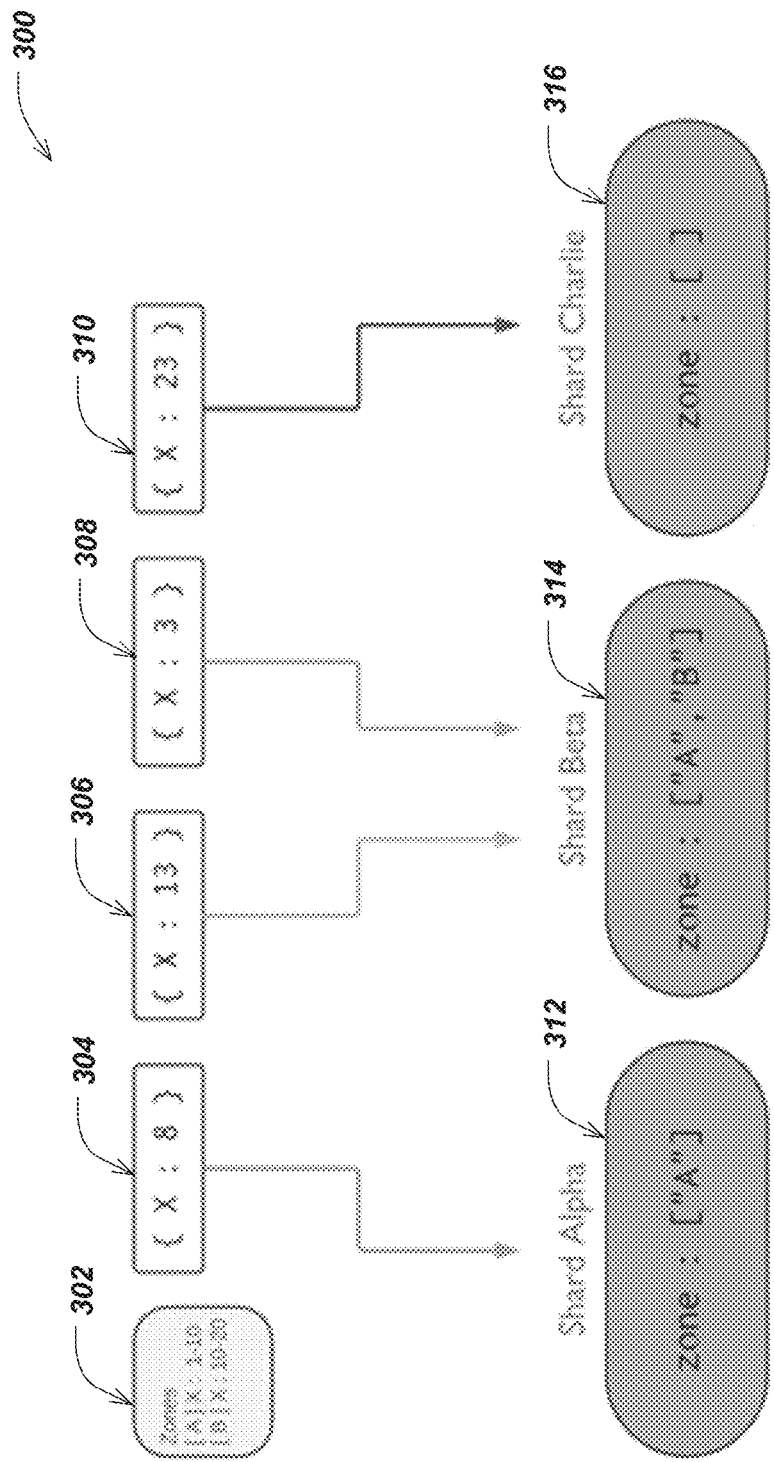
FIG. 3 shows a diagram of an example of shards associated with zones, according to one embodiment.

FIG. 3 illustrates an example embodiment of a sharded cluster 300 with three shards 312-316 and a set 302 of two zones A and B. The zone A represents a shard key range with a lower boundary of 1 and an upper bound of 10. The zone B represents a shard key range with a lower boundary of 10 and an upper boundary of 20. shards Alpha 312 and Beta 314 are associated with the zone A. Shard Beta 314 is associated with both the zone A and zone B. Shard Charlie 316 is not associated with any zones.

In some embodiments, the system can be configured to store data in a particular shard and zone based on a shard key value associated with the data. For example, data items 304-310 each have an associated shard key value. The data item can be routed, moved, and/or stored based on the key value. Data item 304 has a shard key value of 8, and thus can be stored in either shard Alpha 312 or shard Beta 314. In the example cluster 300, data item 304 is stored in shard alpha associated with zone A. Data item 306 has a shard key value of 13, which falls in the shard key range represented by zone B. Accordingly, data item 306 can be stored in shard Beta 314 associated with zone B. Data item has a shard key value of 3, and thus can be stored in either shard Alpha 312 or shard Beta 314. In the example cluster 300, data item 306 and data item 308 are both stored in shard Beta 314 as the shard 314 is associated with both zones A and B. Data item 310 has a shard key value of 23 which does not fall in either of the shard key ranges covered by zones A or B. Accordingly, data item 310 is stored in shard Charlie 316 which is not associated with any zone.

In some embodiments, a data item can comprise a chunk of data. In some embodiments, a data item can comprise a document. Some embodiments are not limited to a particular unit of data or storage.

In some embodiments, data can be routed to a shard based on zones when the data is written. In some embodiments, the system can be configured to automatically move data that has been stored to an appropriate shard based on zones. For example, the system can be configured to periodically perform an operation in which data is transferred to shards such that a respective shard key value of each data item falls within a shard key range of a zone that the shard is associated with. In some embodiments, while the cluster is in a steady state, no chunks violate any of the zones.

A. Behavior and Operations Examples

Ranges

In some embodiments a zone can be configured to cover one or more ranges of shard key values. In some embodiments, a range a zone covers is inclusive of its lower boundary and exclusive of its upper boundary. In some embodiments, a zone can be configured to be inclusive of an upper boundary and exclusive of a lower boundary. In some embodiments, zones are configured to be exclusive. For example, zones cannot share ranges nor can they have overlapping ranges.

Balancer

In some embodiments, the database system (e.g., database system 100) can be configured to include a balancer. The balancer can be configured to evenly distribute a sharded collection's chunks across all shards in the cluster. In some embodiments, a chunk comprises a portion of data within a shard. In some embodiments, a shard may assign data items a shard key. In some embodiments, a shard key comprises one or more fields that exist in data items of a shard. For example, documents in a collection of a non-relational database may be stored in a shard. The documents may all contain a particular field that can be used to index the documents. In this example, the system can be configured to use the value of the field as a respective document's shard key. In some embodiments, a database system can be configured to define a chunk(s) of data using ranges of shard keys. Examples of data chunks are describe in co-pending application Ser. No. 13/078,104 entitled "SYSTEM AND METHOD FOR OPTIMIZING DATA MIGRATION IN A PARTITIONED DATABASE" filed on Apr. 1, 2011, incorporated by reference in its entirety.

In some embodiments, the balancer can be configured to migrate chunks of data using zones. In some embodiments, the balancer can be configured to mark a chunk for migration. For each chunk marked for migration, the balancer checks each possible destination shard for any zones that the shard is associated with. If the chunk range falls into a zone (e.g., in a range of key values covered by the zone), the balancer migrates the chunk into a shard associated with (e.g., inside) that zone. Chunks that do not fall into a zone can exist on one or more shards in a cluster that are not associated with a specific set of zones.

In some embodiments, the balancer can be configured to perform balancing rounds. In a balancing round, the balancer can be configured to detect whether any chunks violate the configured zones for a given shard. The balancer can be configured to automatically migrate those chunks that violate the configured zones to a shard where no conflict exists. For example, the balancer can be configured to migrate the chunks to a shard associated with an appropriate zone and/or migrate chunks to shards that are not associated with any zone.

In some embodiments, after configuring a zone with a shard key range and associating one or more shards with the zone, the cluster may take a period of time to migrate the affected data. In some embodiments, the time taken may depend on the division of chunks and a distribution of data in the cluster. When balancing is complete, database operations (e.g., read, write, update) for data items (e.g., documents or chunks) stored in a given zone are routed only to one or more shards inside that zone.

In some embodiments, once configured, the balancer respects zones during future balancing rounds. In some embodiments, to reduce performance impacts, the balancer may be disabled for a set of data items (e.g., a collection) to insure no migrations take place while configuring new zones. In some embodiments, the balancer may be disabled while reconfiguring a zone to insure that migrations do not take place during reconfiguration.

Shard Key

In some embodiments, the database system (e.g., database system 100) can be configured to use fields contained in the shard key when defining a new range for a zone to cover. In some embodiments, the system can be configured to use a compound shard key. If using a compound shard key, the range may include a prefix of the shard key. For example, given a shard key {a: 1, b: 2, c: 3}, creating or updating a zone to cover values of b requires including a as the prefix. Creating or updating a zone to covers values of c requires including a and b as the prefix.

In some embodiments, the system can be configured to create zones using data in addition to or instead of a shard key value. For example, in order to use zones to partition data based on geographic location, the system can be configured to use geographic data. For example, the system can use GPS coordinates, zip code, address, or other geographic data to create zones. In some embodiments, the shard key can comprise the data as part of a respective shard key value. In embodiments, after sharding, the system may not change the shard key.

Hashed Shard Keys and Zones

In some embodiments, the system can be configured to use a hashed version of a shard key to create zones. In some embodiments, when using hashed shard key to define zones, a zone can be configured to cover the hashed shard key values. For example, given a shard key {a: 1} and a zone alpha with a lower key value bound of 1 and an upper key value bound of 5, the bounds represent the hashed value of 'a', and not the actual value. MongoDB routes any document where the hashed shard key value falls within the range of 1 or 5 to a shard inside zone alpha.

In some embodiments, the system can be configured to create a zone which covers the entire range of shard key values using minkey and maxkey to guarantee that MongoDB restricts all the data for a specific collection to the shard or shards in that zone.

Shard Zone Boundaries

In some embodiments, zone ranges are inclusive of the lower boundary and exclusive of the upper boundary. In some embodiments, zone ranges are inclusive of the lower boundary and the upper boundary. In some embodiments, zone ranges are exclusive of the lower boundary and inclusive of the upper boundary. In some embodiments, zone ranges are exclusive of both the upper and lower boundaries. Some embodiments are not limited to inclusiveness or exclusiveness of the upper or lower boundaries.

B. Manage Shard Zones Examples

In some embodiments, in sharded clusters, the system can be configured to create zones that represent a group of shards and associate one or more ranges of shard key values to that zone. For example, MongoDB can be configured to route reads and writes that have key values that fall into a range represented by a zone to those shards inside of the zone.

Add Shards to a Zone

In some embodiments, a zone may be associated with a particular shard using the sh.addShardTag( ) method when connected to a router (e.g., a mongos instance). In some embodiments, a single shard may be associated with multiple zones, and multiple shards may be associated with the same zone.

Example Method of Adding Shards to Zone

In some embodiments, the following example associates a first and second shard to an "NYC" zone, and associates a third shard to an "SFO" zone and an "NRT" zone:

sh.addShardTag("shard0000", "NYC")

sh.addShardTag("shard0001", "NYC")

sh.addShardTag("shard0002", "SFO")

sh.addShardTag("shard0002", "NRT")

In some embodiments, the system can be configured to remove a zone association from a particular shard using the sh.removeShardTag( )method when connected to a mongos instance. For example, in the following example, which removes the second shard from the "NRT" zone:

sh.removeShardTag("shard0002", "NRT")

Create a Zone Range

In some embodiments, to define the zone's range of shard keys, the system can be configured to use the sh.addTagRange( )method when connected to a mongos instance. In some embodiments, a shard key range may only have one assigned zone. In some embodiments, the system may not overlap defined ranges.

Example of Creating a Zone

In some embodiments, given a collection named 'users' in the 'records database', sharded by the zipcode field, the following operations assign: (1) a first and second range of zip codes in Manhattan and Brooklyn to an "NYC" zone; and (2) a third range of zip codes in San Francisco to an "SFO" zone.

--- sh.addTagRange("records.users", { zipcode: "10001" }, { zipcode: "10281" }, "NYC")

sh.addTagRange("records.users", { zipcode: "11201" }, { zipcode: "11240" }, "NYC")

sh.addTagRange("records.users", { zipcode: "94102" }, { zipcode: "94135" }, "SFO")

---

Remove a Zone Range

In some embodiments, the system can be configured to remove association of one or more data items to a zone. In some embodiments, the system can be configured to remove an association between a range of shard key values and a zone. In some embodiments, each document in the tags holds the namespace of the sharded collection and a minimum shard key value.

Example of Removing Zone

In some embodiments, the following example removes the NYC zone association for a range of zip codes within Manhattan:

```
use config
db.tags.remove({ _id: { ns: "records.users", min: { zipcode: "10001"
}}, tag: "NYC" }
```

In another example, an association of a range of zip codes to the NYC zone can be performed without specification of a zone tag:

```
sh.removeRangeFromZone("records.user", {zipcode: "10001"}, {zipcode: "10281"})
```

View Existing Zones

In some embodiments, the system can be configured to include a command (e.g., sh.status( )) to list the zones associated to each shard in the cluster. In some embodiments, the system can be configured to provide a view of shards zones by querying one or more shard collections in a configuration database.

Example of Viewing Zones

In some embodiments, in the following example, the system uses a search method (e.g., find( )) to return all shards with the "NYC" zone.

```
use config
db.shards.find({ tags: "NYC" })
```

In some embodiments, the system can be configured to find zone ranges for a particular zone. For example, the system can be configured to find all zone ranges for namespaces for a particular tag in a configuration database. In some embodiments, the output of sh.status( ) displays all zone ranges. The following example uses the find( )method to return any range associated to the "NYC" zone.

```
use config
db.tags.find({ tags: "NYC" })
```

C. Segmenting Data by Location Examples

Figure 4A:
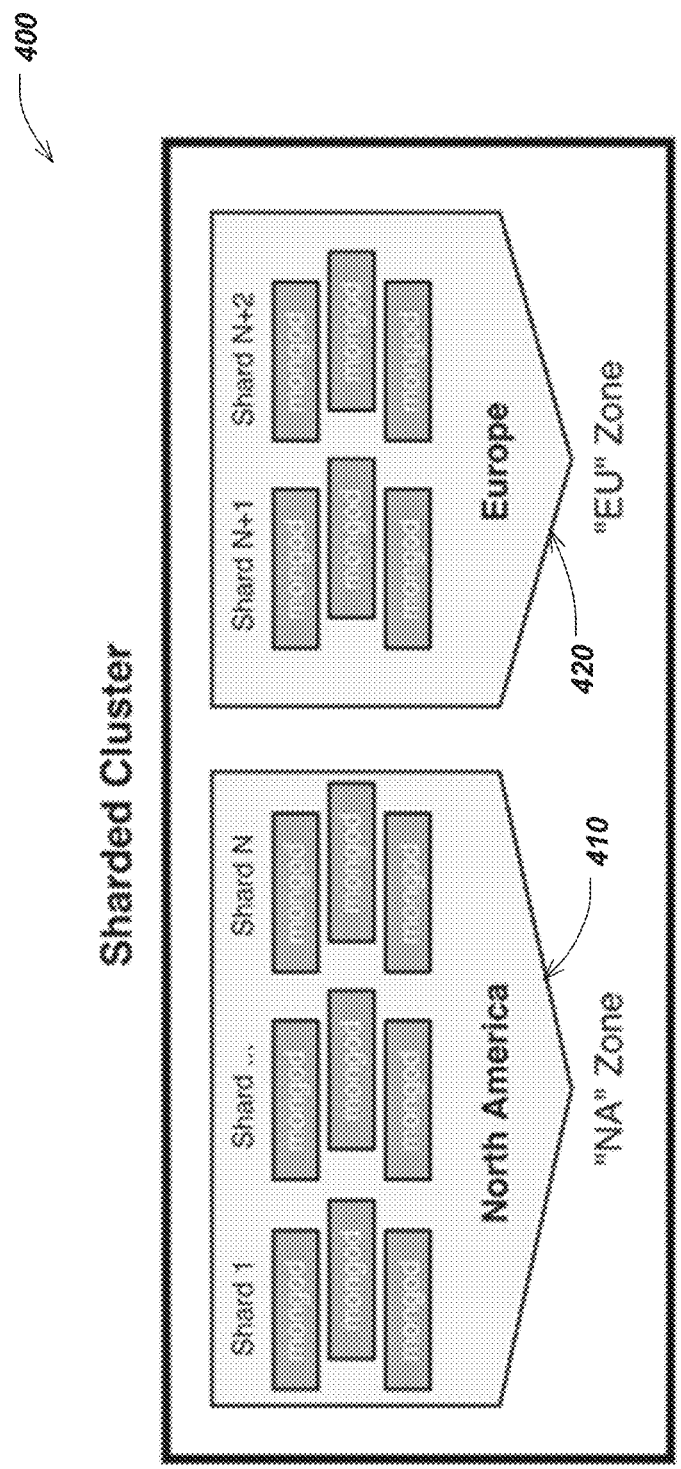
FIGS. 4A-B show block diagrams of an example of shards zoned based on geography according to one embodiment.
Figure 4B:
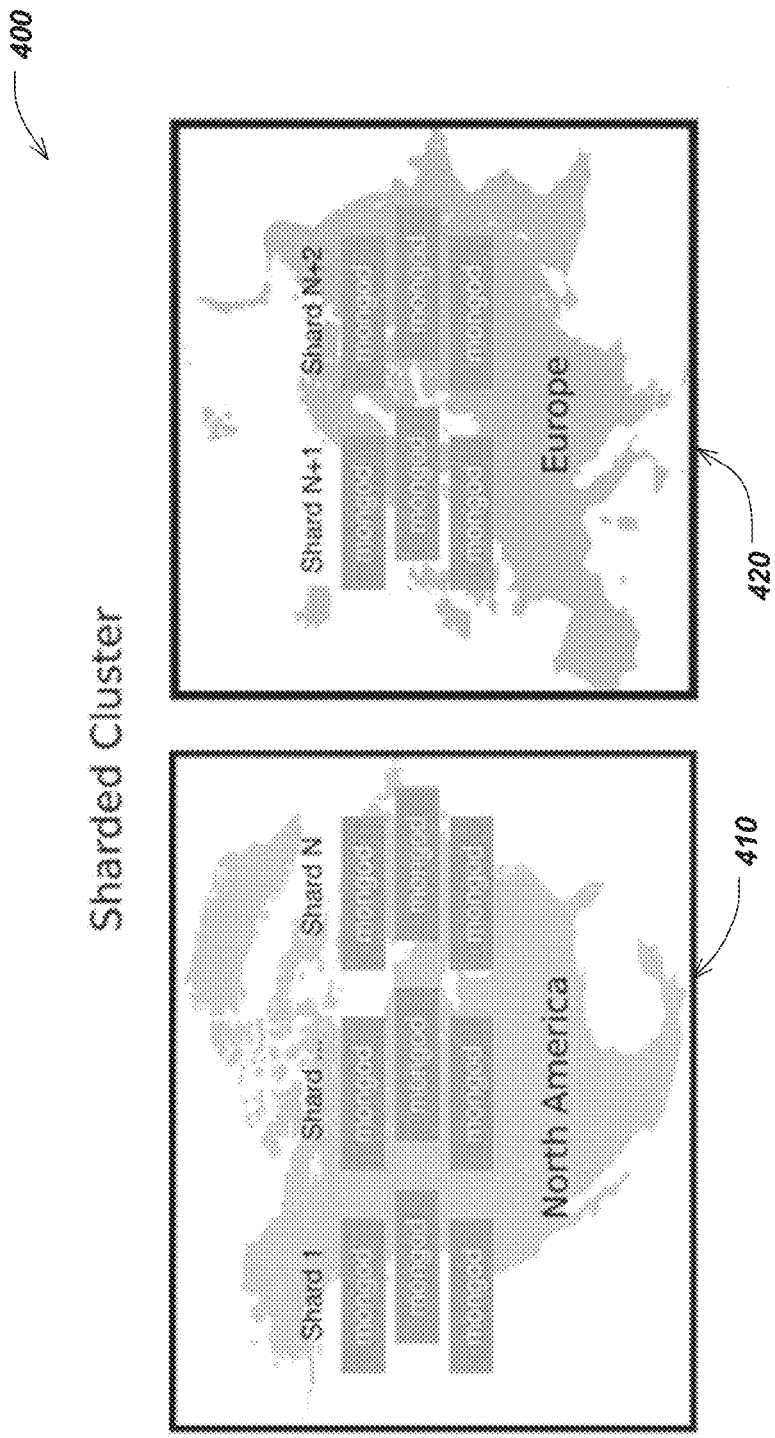

In some embodiments, in sharded clusters, the system can be configured to create zones by geographic location or area. For example, the system can be configured to segment data by geographic location for (1) an application that requires segmenting user data based on geographic country; and (2) a database that requires resource allocation based on geographic country FIGS. 4A-B illustrate an example embodiment of a sharded cluster 400 that uses geographic based zones to manage and satisfy data segmentation requirements. In the sharded cluster 400, a first set of shards (1–N) are designated to a North America zone 410, while a second set of shards ((N+1) to (N+2)) are designated for a Europe zone 420. In some embodiments, to segment data as shown in shard cluster 400, the system can be configured to associate a range of key values to a particular zone. For example, the system can assign a specific zone tag (e.g., "NA") for the North America zone 410 and assign a specific zone tag (e.g., "EU") for the Europe zone 420. The system can then associate specific key ranges with each of the zone tags. The system can, for example, associate key values that are based on geographic data (e.g., GPS coordinates, country, and/or address) with respective zone tags. In another example, the system can associate key values that have been specifically limited for use to entities (e.g., applications, users) associated with one of the two locations to a respective tag. In some embodiments, each zone can represent one or more data centers of the zone. For example, the North America zone 410 can represent the data center(s) in North America while the Europe zone 420 can represent the data center(s) in Europe.

Example Location Based Zone Scenario

In one example implementation, a chat application logs messages, tracking the country of an originating user. The application stores the logs in the chat database under the messages collection. The chats contain information that is to be segmented by country to have servers local to the country serve read and write requests for the country's users. A group of countries can be assigned a same zone in order to share resources.

In one example implementation, the application currently has users in the US, UK, and Germany. The country field represents the user's country based on its ISO 3166-1 Alpha-2 two-character country codes. The following documents represent a partial view of three chat messages:

```
{
    "_id" : ObjectId("56f08c447fe58b2e96f595fa"),
    "country" : "US",
    "userid" : 123,
    "message" : "Hello there",
    ...,
}
{
    "_id" : ObjectId("56f08c447fe58b2e96f595fb"),
    "country" : "UK",
    "userid" : 456,
    "message" : "Good Morning"
    ...,
}
{
    "_id" : ObjectId("56f08c447fe58b2e96f595fc"),
    "country" : "DE",
    "userid" : 789,
    "message" : "Guten Tag"
    ...,
}
```

This example application has one zone per data center. FIGS. 4A-B illustrate an example sharded cluster distribution in two zones: a North America zone 410 and a Europe zone 420. In some embodiments, each zone can represent one or more data centers of the zone. For example, the North America zone 410 can represent the data center(s) in North America while the Europe zone 420 can represent the data center(s) in Europe. The following describes an example assignment of zones that can be assigned according to some embodiments described herein:

EU—European Data Center(s)

In some embodiments, shards deployed on the Europe data center(s) can be assigned to the Europe zone 420. For each country using the Europe data center(s) for local reads and writes, the system can create one or more zone ranges for the Europe zone 420 with:

a lower bound of {"country": <country>, "userid": MinKey} an upper bound of {"country": <country>, "userid": MaxKey}

For example, the system can create a range for each country that is to be included in the Europe zone 420, and associate the range with the Europe zone 420.

NA—North American Data Center(s)

In some embodiments, shards deployed on the North America data center(s) are assigned to the North America zone 410. For each country using the North America data center(s) for local reads and writes, create a zone range for the NA zone with:

a lower bound of {"country": <country>, "userid": MinKey} an upper bound of {"country": <country>, "userid": MaxKey}

For example, the system can create a range for each country that is to be included in the North America zone 410, and associate the range with the North America zone 410.

In some embodiments, with zones, if an inserted or updated document matches a configured zone, it can only be written to a shard inside of that zone. In some embodiments, the system can be configured to write documents that are not associated with any zone (e.g., do not have a key value that falls into a range associated with any zone) to any shard in the cluster. In some embodiments, the system can be configured to route queries to a specific shard if the query includes at least the country field. For example, MongoDB can attempt a targeted read operation on the following query:

```
chatDB = db.getSiblingDB("chat")
chatDB.messages.find( { "country" : "UK" , "userid" : "123" } )
```

In the above example, MongoDB may read the messages for the user ID "123" in the United Kingdom from shards associated with the Europe zone 420.

In some embodiments, the balancer migrates chunks to the appropriate shard respecting any configured zones. Until the migration, shards may contain chunks that violate configured zones. Once balancing completes, shards contain chunks whose ranges do not violate its assigned zones. Adding or removing zones or zone ranges can result in chunk migrations. In some embodiments, the size of a data set and the number of chunks a zone or zone range affects, these migrations may impact cluster performance.

Example command to add each shard in the North American data center to the NA zone:

sh.addShardTag(<shard name>, "NA")

Example command to add each shard in the European data center to the EU zone:

sh.addShardTag(<shard name>, "EU")

In some embodiments, for shard key values where the country is the United States of America, the system can be configured to define a shard key range and associate it to the North America zone 410 using the sh.addTagRange( ) method. For shard key values where country is the United Kingdome, the system can define a shard key range and associate it to the Europe zone 410. In some embodiments, to perform these processes, the system can be configured to use: a full namespace of the target collection, an inclusive lower bound of the range, an exclusive upper bound of the range, and a name of the zone. Example code is shown below.

```
sh.addTagRange(
   "chat.messages",
   { "country" : "US", "userid" : MinKey },
```

```
   { "country" : "US", "userid" : MaxKey },
   "NA"
)
sh.addTagRange(
   "chat.messages",
   { "country" : "UK", "userid" : MinKey },
   { "country" : "UK", "userid" : MaxKey },
   "EU"
)
```

In some embodiments, the MinKey and MaxKey values are reserved special value for comparisons. MinKey always compares as lower than every other possible value, while MaxKey always compares as higher than every other possible value. The configured ranges captures every user for each device.

In some embodiments, the system can be configured to remove zones. In some embodiments, the system can be configured to remove zones using, a full namespace of the target collection, an inclusive lower bound of the range, an exclusive upper bound of the rang, and a name of the zone. Example code to remove a zone is shown below.

```
sh.removeTagRange(
   "chat.messages",
   { "country" : "UK", "userid" : MinKey },
   { "country" : "UK", "userid" : MaxKey }
   "EU"
)
```

D. Segmenting Data Based on Service Level Agreement (SLA)

In some embodiments, the system can be configured to use zones to segment data based on Service Level Agreement (SLA) or Service Level Objective (SLO). An SLA can comprise a commitment between the system and a client system to provide a particular level of performance (e.g., latency, throughput), quality, standard, and/or other commitment. An SLO can comprise a particular objective that is to be met according to an SLA. For example, the SLO can comprise a particular level of performance (e.g. level of latency, throughput), level of quality, and/or other objective. In one illustrative example, the system can segment data based on Service Level Agreement (SLA) or Service Level Objective (SLO) for an application requires providing low-latency access to recently inserted/updated documents, an application requires prioritizing low-latency access to a range or subset of documents, or an application that benefits from ensuring specific ranges or subsets of data are stored on servers with hardware that suits the SLA's for accessing that data.

Figure 5:
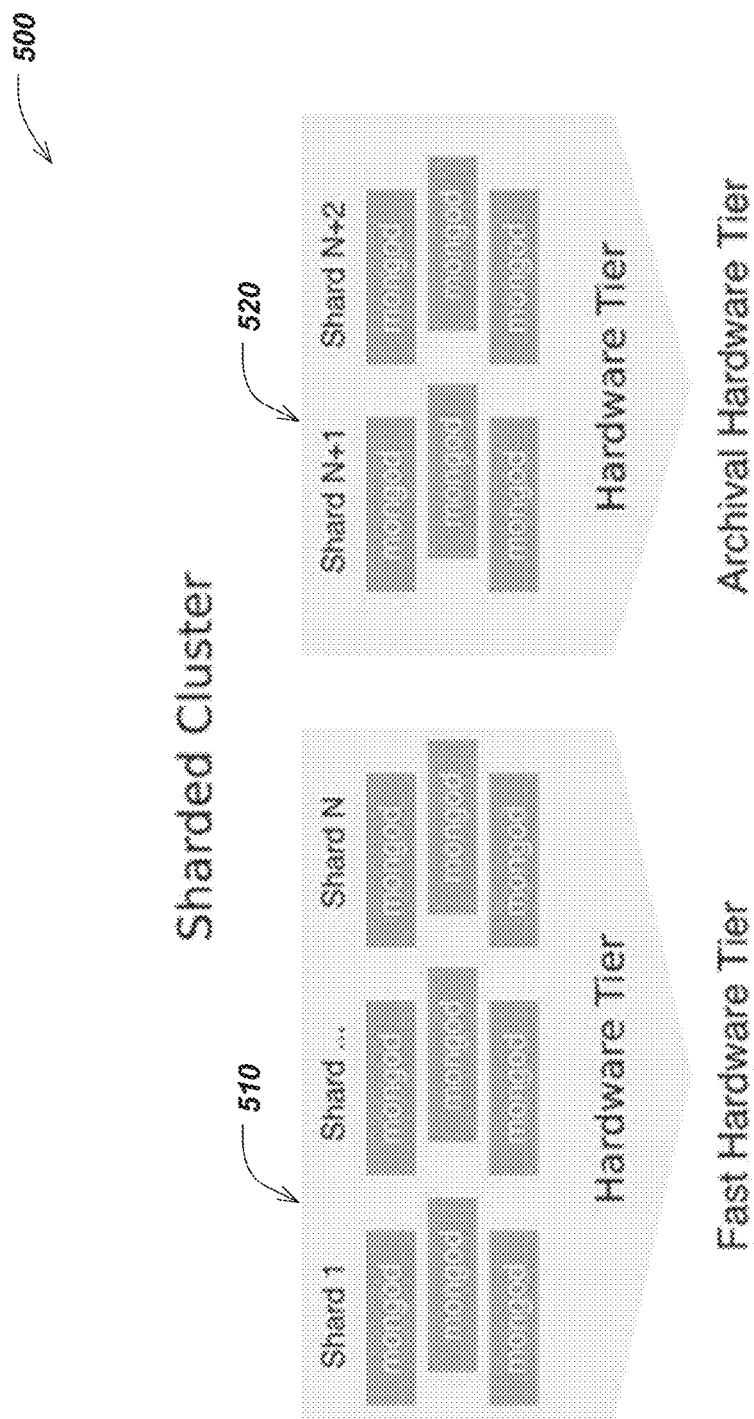
FIG. 5 shows a block diagram of an example of shards zoned based on hardware according to one embodiment.

FIG. 5 illustrates an example sharded cluster 500 that uses hardware based zones to satisfy data access SLAs or SLOs, in accordance with some embodiments of the technology described herein. In example cluster 500, shards 1 to N have been associated with a zone that is to meet a first SLO (e.g., a fast hardware tier) while shards (N+1) to (N+2) have been associated with a second SLO (e.g., an archival hardware tier). For example, a particular client may require that certain types of data are able to be accessed more quickly than other types of data. Accordingly, the system can designate zones to store data that requires faster access to shards 1 to N in the fast hardware tier zone 510 while data that does not require as fast access to shards (N+1) to (N+2) in the archival hardware tier zone 520.

Example SLA/SLO Based Zoning Scenario

In one example implementation, a photo sharing application requires fast access to photos uploaded within the last 6 months. The application stores the location of each photo along with its metadata in the photoshare database under the data collection. The following documents represent photos uploaded by a single user:

```
{
    "_id" : 10003010,
    "creation_date" : ISODate("2012-12-19T06:01:17.171Z"),
    "userid" : 123,
    "photo_location" : "example.net/storage/usr/photo_1.jpg"
}
{
    "_id" : 10003011,
    "creation_date" : ISODate("2013-12-19T06:01:17.171Z"),
    "userid" : 123,
    "photo_location" : "example.net/storage/usr/photo_2.jpg"
}
{
    "_id" : 10003012,
    "creation_date" : ISODate("2016-01-19T06:01:17.171Z"),
    "userid" : 123,
    "photo_location" : "example.net/storage/usr/photo_3.jpg"
}
```

In some embodiments, the system can be configured to use the {creation_date: 1} index as the shard key. The creation date field in each document allows for designating data items to particular zones based on the creation date.

Figure 6A:
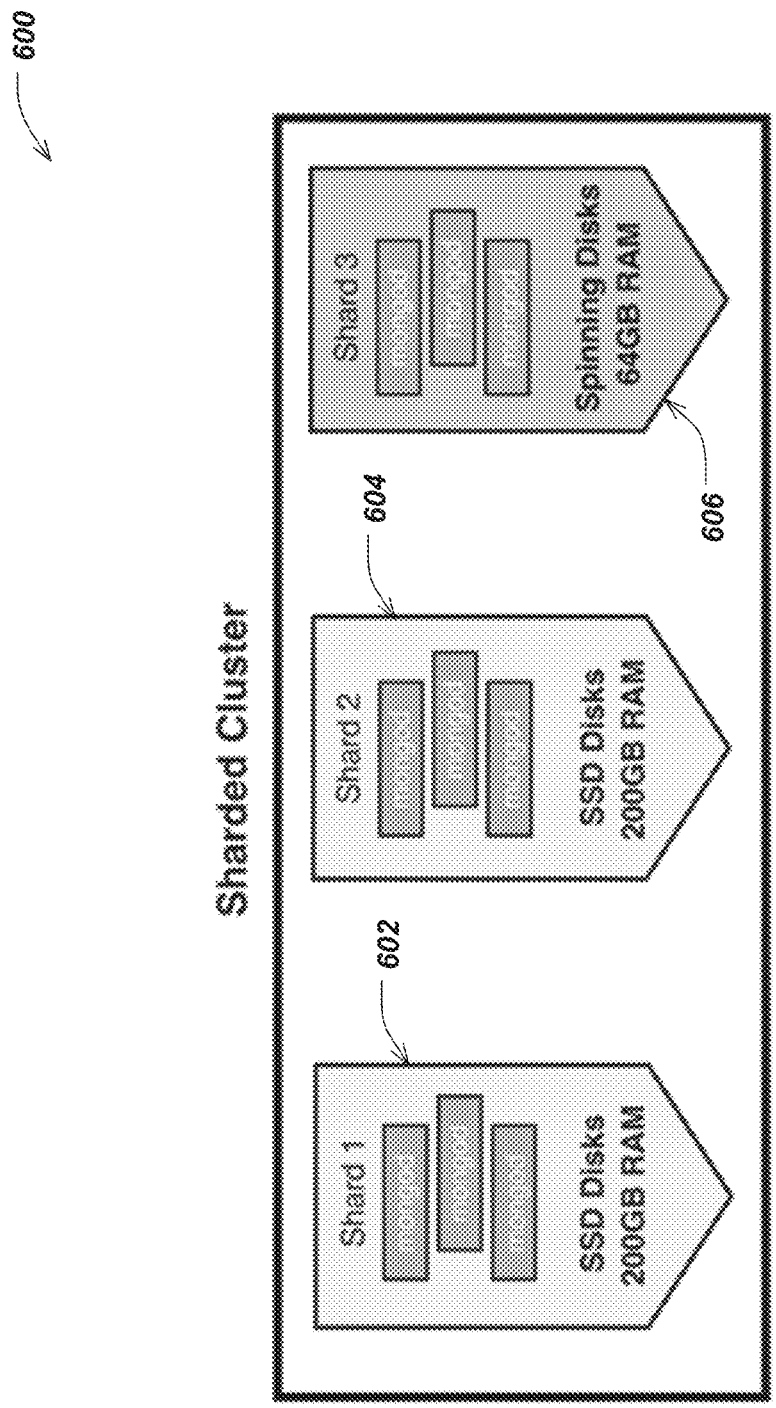
FIGS. 6A-B show block diagrams of an example of shards zoned based on data type according to one embodiment.
Figure 6B:
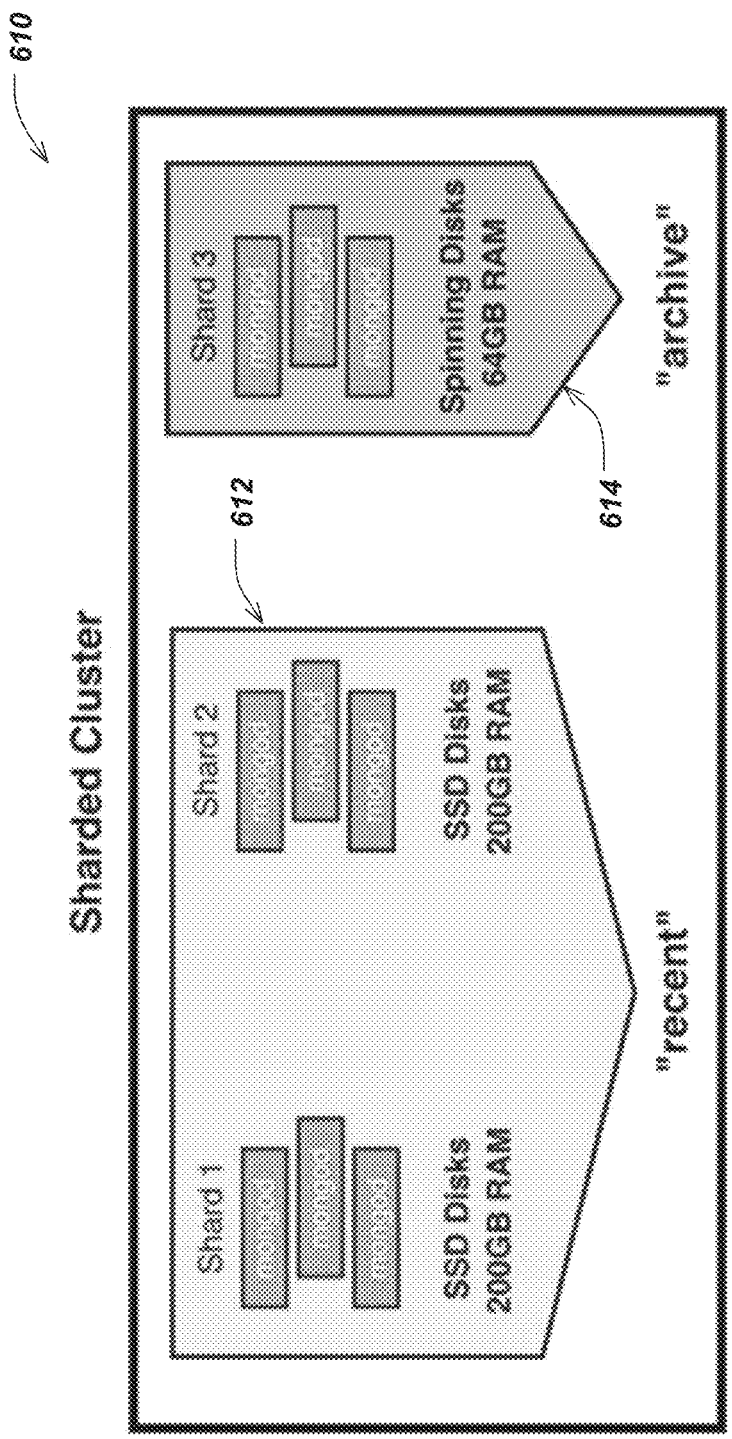

FIGS. 6A-B illustrate an example cluster deployment 600 that is zoned according to an SLA or SLO, in accordance with some embodiments of the technology described herein. The sharded cluster deployment 600 comprises three shards (602-606). FIG. 6B illustrates an example zone topology 610 of the sharded cluster 600. The application may, for example, require adding each shard to a zone based on its hardware tier. A hardware tier can represent a specific hardware configuration designed to satisfy a given SLA or SLO. In FIG. 6B, the "recent" zone 612 may comprise fast tier machines that are the fastest performing machines, with large amounts of RAM, fast SSD disks, and/or powerful CPUs. In this example, the zone requires a range with:
- a lower bound of {creation_date: ISODate(YYYY-mm-dd)}, where the Year, Month, and Date specified by YYYY-mm-dd is within the last 6 months.
- an upper bound of {creation_date: MaxKey}.

The "archive" zone 614 may use an archival tier of machines which use less RAM, have slower disks, and/or have CPUs of lower power. However, they may have a greater amount of storage per server. In this example, the zone requires a range with:
- a lower bound of {creation_date: MinKey}.
- an upper bound of {creation_date: ISODate(YYYY-mm-dd)}, where the Year, Month, and Date match the values used for the recent tier's lower bound.

In some embodiments, as performance needs increase, the system may add additional shards and associate them to the appropriate zone based on their hardware tier to scale the cluster horizontally. In some embodiments, when defining zone ranges based on time spans, the system may weigh the benefits of infrequent updates to the zone ranges against the amount of data that must be migrated on an update. For example, setting a limit of 1 year for data to be considered 'recent' likely covers more data than setting a limit of 1 month. While there are more migrations required when rotating on a 1 month scale, the amount of documents that must be migrated is lower than rotating on a 1 year scale.

In some embodiment, with zones, if an inserted or updated document matches a configured zone, the system can be configured to limit writing the document to a shard inside that zone. MongoDB can write documents that do not match a configured zone to any shard in the cluster.

In some embodiments, MongoDB can route queries to a specific shard if the query includes the shard key. For example, MongoDB can attempt a targeted read operation on the following query because it includes a creation date in the query document:

photoDB=db.getSiblingDB("photoshare")
photoDB.data.find({"creation_date": ISODate("2015-01-01")})

In some embodiments, if the requested document falls within the recent zone range, MongoDB would route this query to the shards inside that zone, ensuring a faster read compared to a cluster-wide broadcast read operation. Shards may be added to the appropriate zone. Below are example commands to add shards to particular zones:

Command to add shard0000 to the recent zone.
sh.addShardTag("shard0000", "recent")
Command to add shard0001 to the recent zone.
sh.addShardTag("shard0001", "recent")
Command to add shard0002 to the archive zone.
sh.addShardTag("shard0002", "archive")

In some embodiments, a range can be defined for each zone. For example, the system may use one or more of the following to define a range for a respective zone: a full namespace of the target collection, a lower bound of the range, an upper bound of the range and the zone (e.g., a zone identifier). Below is an example command to define a "recent" and a "archive" zone:

```
sh.addTagRange(
    "photoshare.data",
    { "creation_date" : ISODate("2016-01-01") },
    { "creation_date" : MaxKey },
    "recent"
)
sh.addTagRange(
    "photoshare.data",
    { "creation_date" : MinKey },
    { "creation_date" : ISODate("2016-01-01") },
    "archive"
)
```

In some embodiments, the system can be configured to remove a range from a zone. In some embodiments, the system can be configured to use one or more of the following to remove a range from a zone: a full namespace of the target collection, a lower bound of the range, an upper bound of the range, and/or the zone (e.g., an identifier of the zone). Below are example commands to remove zone ranges:

```
sh.removeTagRange(
    "photoshare.data",
    { "creation_date" : ISODate("2016-01-01") },
    { "creation_date" : MaxKey },
    "recent"
)
sh.removeTagRange(
    "photoshare.data",
    { "creation_date" : MinKey },
    { "creation_date" : ISODate("2016-01-01") },
    "archive"
)
```

E. Segment Data by Application or Customer

Figure 7:
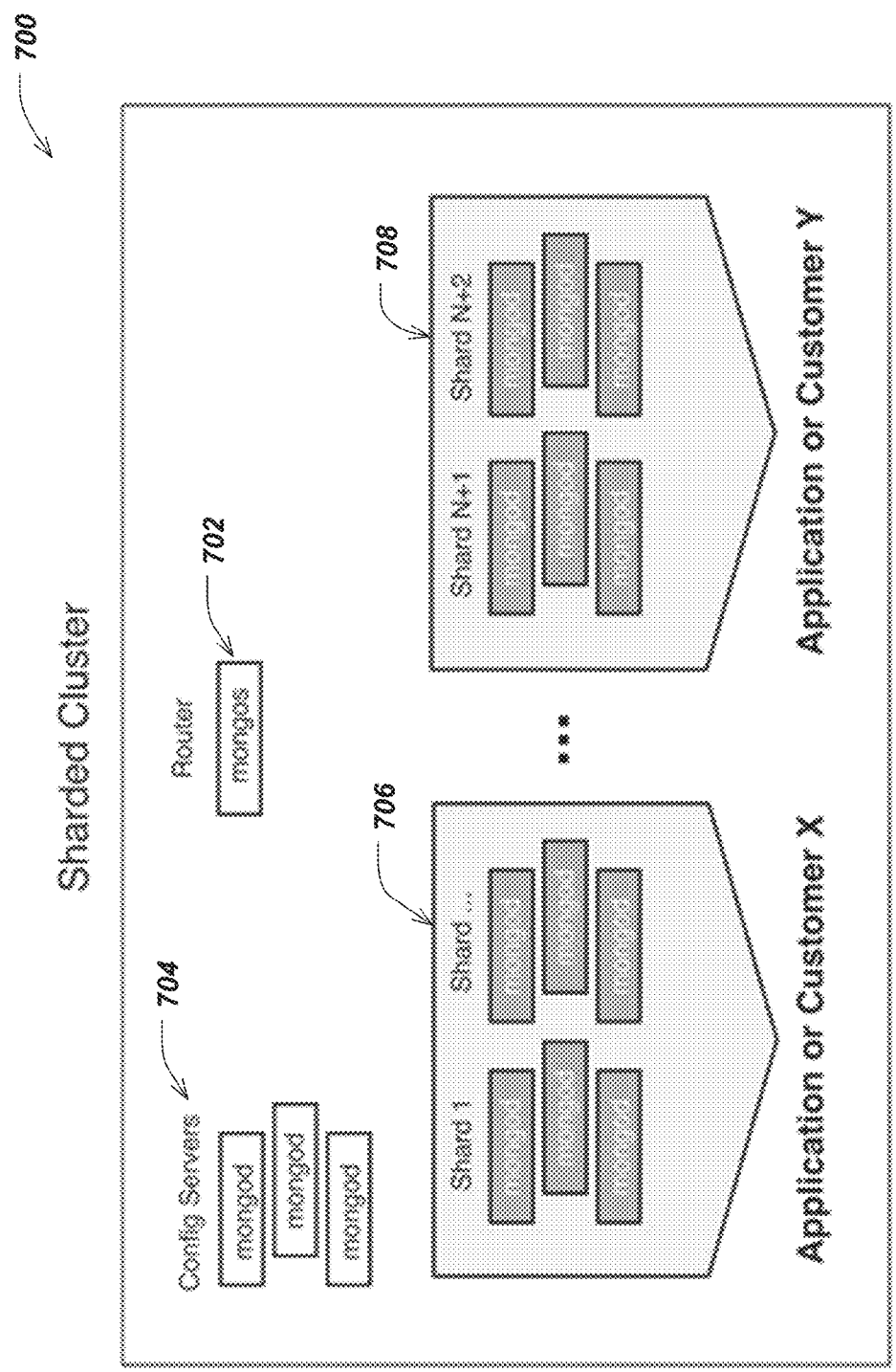
FIG. 7 shows a block diagram of an example of shards zoned based on application according to one embodiment.

In some embodiments, the system can be configured to segment data by application or customer. The following scenarios are examples where this may be necessary: a database serving multiple applications, a database serving multiple customers, a database that requires isolating ranges or subsets of application or customer data, a database that requires resource allocation for ranges or subsets of application or customer data FIG. 7 illustrates an example embodiment of a sharded cluster 700 with zones to segment data based on application or customer, in accordance with some embodiments of the technology described herein. This may allow for data to be isolated to specific shards. In some embodiments, a shard may have specific hardware allocated to fit the performance requirement of the data stored on that shard. The sharded cluster 700 includes a routing service 702 (e.g., mongos) configured to receive requests from a client (e.g., an application), and which determines the location of data items in order to perform one or more operations in response to the requests. The sharded cluster 700 includes one or more configuration servers 704 (e.g, mongod) configured to perform database operations, handle data requests, manage data access, perform background management operations, and perform other tasks. The sharded cluster 700 can comprise a plurality of zones. For example, as illustrated in FIG. 7, the plurality of zones can include (1) a first zone 706 designated for a first application or customer X, and (2) a second zone 708 designated for a second application or customer Y. A first set of shards 1 to N may be associated (e.g., inside) the first zone 706, and a second set of shards (N+1) to (N+2) may be associated with the second zone 708. The system can be configured to direct data items and/or operations to one of the zones based on an application or customer association of the data item and/or operation. For example, a data item originated by application X can be stored in the first zone 706 while a data item originated by application Y can be stored in the second zone 708. In another example, a request from customer X perform a read operation data can be routed to the first zone 706 for performance, while a request from customer Y to perform a read operation can be routed to the second zone 708.

Example Scenario of Application/Customer Segmenting Via Zones

In one example implementation, an application tracks the score of a user along with a client field, and stores the scores in a database. In some embodiments, the scores may be stored in collections designated for respective users. The system can be configured to designate each value of a client to its own zone to allow for data segmentation. This may also allow the system to optimize the hardware for each shard associated to a client for performance and cost. The following documents represent a partial view of two users:

```
{
  "_id" : ObjectId("56f08c447fe58b2e96f595fa"),
  "client" : "robot",
  "userid" : 123,
  "high_score" : 181,
  ...,
}
{
  "_id" : ObjectId("56f08c447fe58b2e96f595fb"),
  "client" : "fruitos",
  "userid" : 456,
  "high_score" : 210,
  ...,
}
```

For the collection of users, the system can be configured to use the {client: 1, userid: 1} compound index as the shard key. The client field in each document allows creating a zone for each distinct client value. The user ID field can provide a high cardinality and low frequency component to the shard key relative to the client. Cardinality can represent a maximum number of data items having a particular key value that can be stored (e.g., in a sharded cluster). A frequency can represent how often a given key value occurs in the data.

Figure 8A:
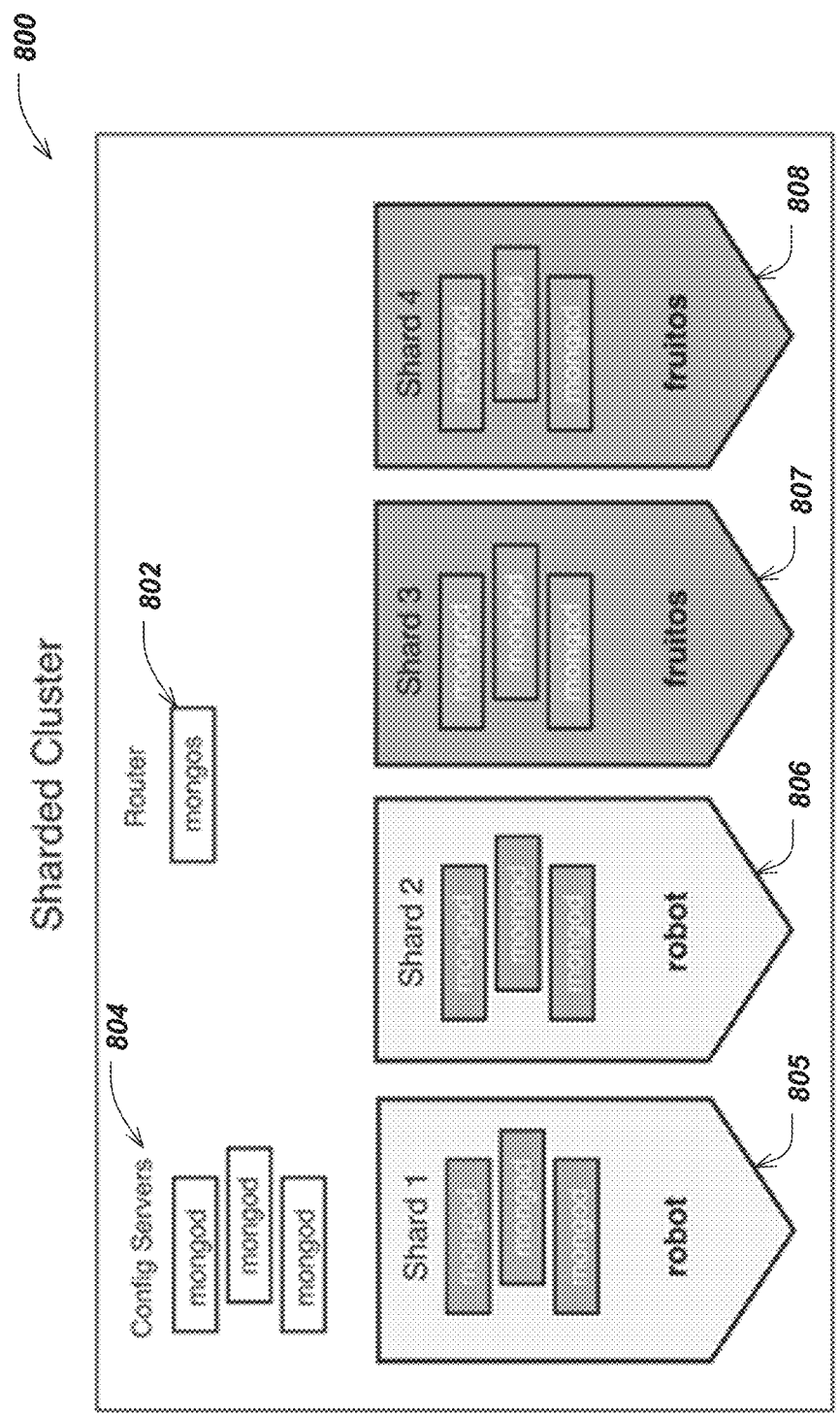
FIGS. 8A-B show block diagrams of an example of shards zoned based on client according to one embodiment.

In some embodiments, the application may require adding a shard to a zone associated to a specific client. FIG. 8A illustrates an example shard cluster 800 with two shards 805-806 belonging to a "robot" client (e.g., an application) and two shards 807-808 belonging to a "fruitos" client (e.g., an application). The shard cluster may include a router service 802 (e.g., mongos) that routes data items and/or operations to shards, and one or more configuration servers 804 that perform operations, management activities, and other tasks.

Figure 8B:
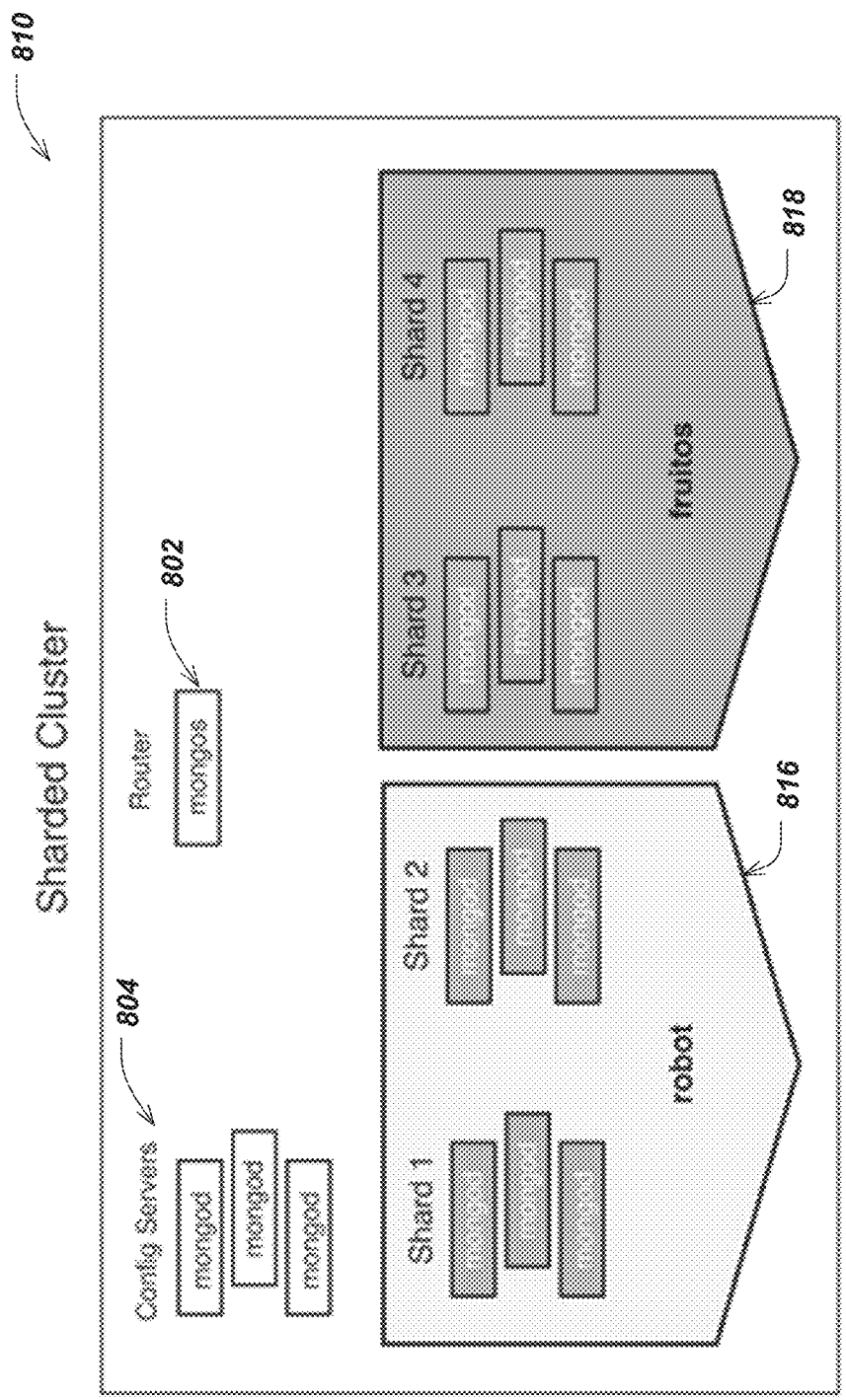

FIG. 8B illustrates an example zone segmentation 810 of the shards 805-808 of FIG. 8A, in accordance with some embodiments of the technology described herein. The robot zone 816 can be associated with the shards 805-806 belonging to the "robot" client, and the "fruitos" zone 818 can be associated with the shards 807-808 belonging to the "fruitos" client. For example, the "robot" zone 816 represents all documents where client: robot, and the "fruitos" zone represents all documents where client: fruitos. Data items and/or operations can be routed to a particular zone by the router service 802 based on a zone association of the data item and/or operation. In some embodiments, for write operations, if an inserted or updated document is associated with a configured zone, the system can be configured to write the document to a shard inside the configured zone. In some embodiments, MongoDB can write documents that are not associated with a configured zone to any shard in the cluster. In some embodiments, the system can be configured to route queries to a specific shard if the query includes at least the client field. For example, MongoDB can perform a targeted read operation on the following query by directing the operation to a shard in a particular zone:

```
chatDB = db.getSiblingDB("gamify")
chatDB.users.find( { "client" : "robot" , "userid" : "123" } )
```

In some embodiments, the system can be configured to add shards to zones. Below are example commands to add shards to particular zones:

Add shard0000 to the robot zone:

sh.addShardTag("shard0000", "robot")

Add shard0002 to the fruitos zone:

sh.addShardTag("shard0002", "fruitos")

In some embodiments, the system can be configured to define one or more ranges for each client and associate them to the robot zone. In some embodiments, the system can be configured to use one or more of the following to define ranges for a client: a full namespace of the target collection, an inclusive lower bound of the range, an exclusive upper bound of the range, and a name of the zone. Below are example commands for defining zones for each client:

```
sh.addTagRange(
    "gamify.users",
    { "client" : "robot", "userid" : MinKey },
    { "client" : "robot", "userid" : MaxKey },
    "robot"
)
sh.addTagRange(
    "gamify.users",
    { "client" : "fruitos", "userid" : MinKey },
    { "client" : "fruitos", "userid" : MaxKey },
    "fruitos"
)
```

F. Distributed Operations

In some embodiments, zones may be used along with a multi-datacenter sharded cluster deployment and application-side logic to support distributed operations. In some embodiments, the distributed operations can support performing operations locally (e.g. local writes), as well as having availability to perform operations in the event of a replica set election or datacenter failure.

Example Scenario of Insert-Intensive Application

In one example implementation, an application may be insert-intensive, where reads are infrequent and low priority compared to writes. The application writes documents to a sharded collection, and requires near-constant uptime from the database. In some embodiments, the near-constant uptime may be required to support an SLA or SLO. Below are example partial views of a format of documents the application may write to a database:

```
{
    "_id" : ObjectId("56f08c447fe58b2e96f595fa"),
    "message_id" : 329620,
    "datacenter" : "alfa",
    "userid" : 123,
    ...
}
{
    "_id" : ObjectId("56f08c447fe58b2e96f595fb"),
    "message_id" : 578494,
    "datacenter" : "bravo",
    "userid" : 456,
    ...
}
{
    "_id" : ObjectId("56f08c447fe58b2e96f595fc"),
    "message_id" : 689979,
    "datacenter" : "bravo",
    "userid" : 789,
    ...
}
```

In some embodiments, the collection can use datacenter and user ID identifiers as the shard key. For example, the collection can use a {datacenter: 1, userid: 1} compound index as the shard key. The datacenter field in each document allows for creating a range for each distinct datacenter value. Without the datacenter field, it would not be possible to associate a document with a specific datacenter. The userid field provides a high cardinality and low frequency component to the shard key relative to datacenter.

Figure 9:
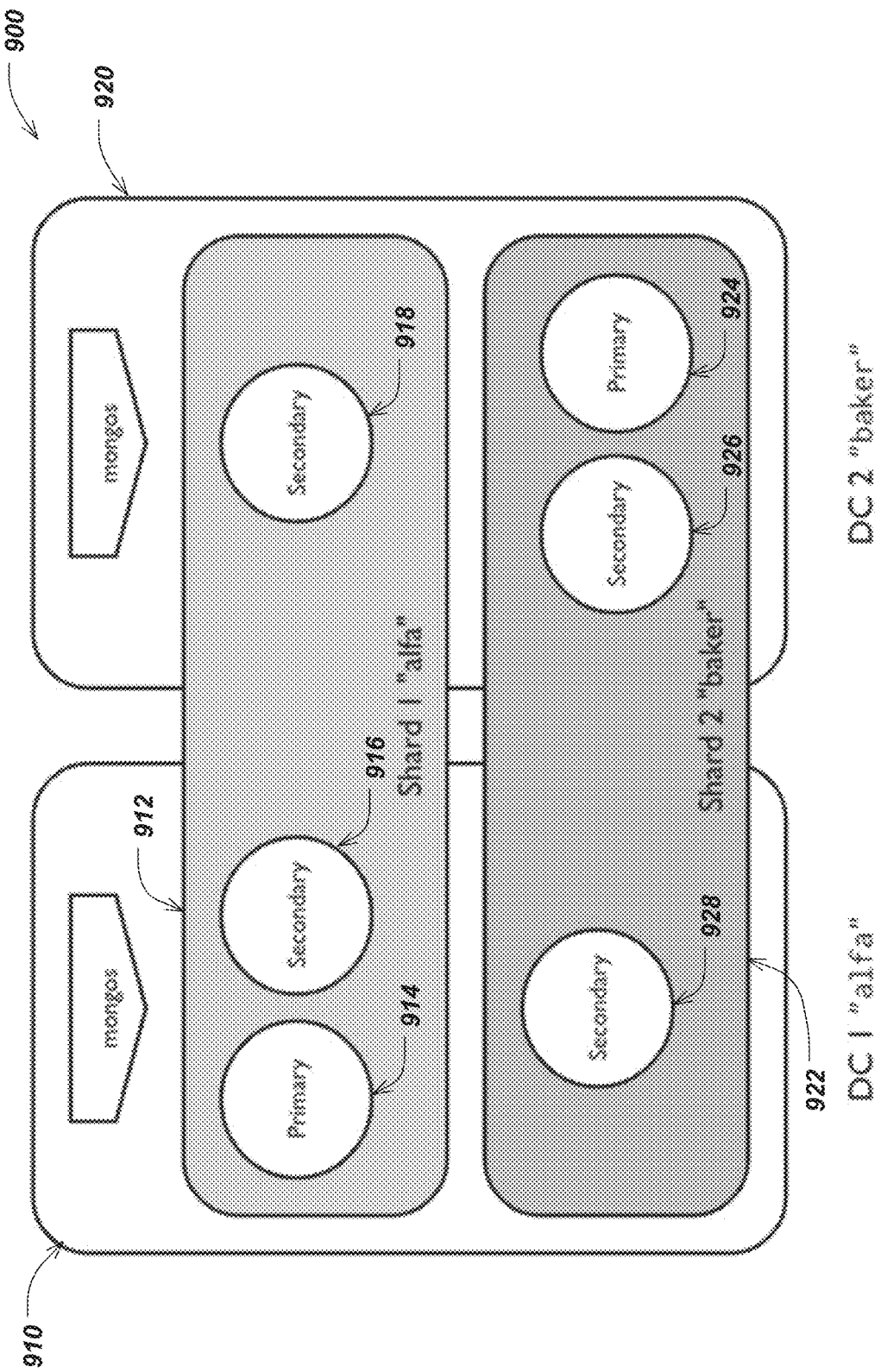
FIG. 9 shows a block diagram of an example database deployment, according to one embodiment.

FIG. 9 illustrates an example deployment 900 of the example application, in accordance with some embodiments of the technology described herein. The deployment 900 consists of (1) two datacenters, a first datacenter 910 and a second datacenter 920, and (2) two shards, a first shard 912 and a second shard 922. Each shard is a replica set with three members. In some embodiments, a shard may be associated with a particular zone based on the datacenter that hosts a majority of the members (e.g., nodes) of the shard. For example, as illustrated in deployment 900, the first shard 912 is associated with the first datacenter zone as the first datacenter 910 hosts a majority of the nodes of the first shard 912. Similarly, the second shard 922 is associated with the second datacenter zone as the second datacenter 920 hosts a majority of the members of the second shard 922. The first shard 912 has two members (e.g., nodes) on the first data center 910 and one member on the second datacenter 920. The second shard 922 has two members (e.g., nodes) on the second datacenter 920 and one member on the first datacenter 910. The system can be configured to create a range for each datacenter. The first datacenter 910 tag range can be created with:

- a lower bound of {"datacenter": "alfa", "userid": MinKey},
- an upper bound of {"datacenter": "alfa", "userid": MaxKey}, and
- the tag alfa The second datacenter 920 tag range can be created with:

- a lower bound of {"datacenter": "baker", "userid": MinKey},
- an upper bound of {"datacenter": "baker", "userid": MaxKey}, and
- the tag baker Based on the configured tags and tag ranges, the system (e.g., a routing service mongos) can be configured to route data items (e.g., documents) associated with a datacenter tag of "alfa" to the first datacenter 910, and documents with a datacenter tag of "baker" to the second datacenter 920.

In some embodiments, if an inserted or updated document matches a configured tag range, the system may only write it to a shard with the related tag. In some embodiments, the system can be configured to write documents that do not match a configured tag range to any shard in the cluster. In some embodiments, the system can be configured to write to the nearest datacenter by default. If the local datacenter is down, or if writes to that datacenter are not acknowledged within a set time period, the system can be configured to switch to another available datacenter by changing the value of the datacenter field before attempting to write the document to the database.

In some embodiments, the system can be configured to support write timeouts. The system can be configured to use a write concern to set a timeout for each write operation. For example, if the system encounters a write or timeout error, the system can be configured to modify the datacenter field in a data item, and perform the write with the modified datacenter field. The system may route the document to the other datacenter. If all datacenters are down, then system may determine that the write has failed. For example, the system can be configured to generate a failed write status or message. In some embodiments, the system can be configured to periodically check connectivity to any data centers marked as "down". If connectivity is restored, the system can be configured to continue performing normal write operations.

In some embodiments, given the switching logic, as well as any load balancers or similar mechanisms in place to handle client traffic between datacenters, the system may be unable to determine which datacenter a data item was written to. To ensure that no documents are missed as a part of read operations, the system can be configured to perform broadcast queries by not including the datacenter field as a part of any query. In some embodiments, the system can be configured to perform reads using a read preference of nearest to reduce latency. For example, the system can be configured to direct read operations to a datacenter that is geographically closes to a location originating the read request.

In some embodiments, the system can be configured to successfully perform a write operation despite a reported timeout error. The system can be configured to respond to the error by attempting to re-write the document to another datacenter, which may result in a document being duplicated across both datacenters. The system can be configured to resolve duplicates as a part of the read logic. For example, the system can be configured to automatically remove duplicates discovered during a read operation.

In some embodiments, the system can be configured with logic to switch datacenters in response to a detected failure or other event. For example, the system can be configured to switch datacenters if one or more writes fail, or if writes are not acknowledged within a set time period. The system can be configured to modify the datacenter field based on the target datacenter's tag to direct the document to a different datacenter than the original write command. For example, when the system attempts to write to the first datacenter 910, the system may follow the following general procedure:

1. Attempt to write document, specifying datacenter: alfa.
2. On write timeout or error, log alfa as momentarily down.
3. Attempt to write same document, modifying datacenter: bravo.
4. On write timeout or error, log bravo as momentarily down.
5. If both alfa and bravo are down, log and report errors.

In some embodiments, the system can be configured to associate shards with each datacenter which can be represented by a zone. Below are example commands to configure the separate zones:

sh.addShardTag ("shard0000", "alfa")
sh.addShardTag ("shard0001", "bravo")

In some embodiments, a range may be defined for each tag. In some embodiments, the system can be configured to use one or more of the following to define a range: a full namespace of the target collection, a lower bound of the range, an upper bound of the range, and an identifier of the zone (e.g., a zone tag).

Below are example commands to define ranges for each zone:

```
sh.addTagRange(
   "<database>.<collection>",
   { "datacenter" : "alfa", "userid" : MinKey },
   { "datacenter" : "alfa", "userid" : MaxKey },
   "alfa"
)
sh.addTagRange(
   "<database>.<collection>",
   { "datacenter" : "bravo", "userid" : MinKey },
   { "datacenter" : "bravo", "userid" : MaxKey },
   "bravo"
)
```

In some embodiments, the MinKey and MaxKey values are configured to be reserved special values for comparisons. MinKey, for example, can be configured to be less than every other possible value for a key, while MaxKey can be configured to be greater than every other possible value for the key. The configured ranges can be configured to capture every data item for each datacenter.

In some embodiments, when the a default datacenter (e.g., a datacenter designated by default for an application) is down or inaccessible, the system can be configured to change the datacenter field to the other datacenter. For example, the application attempts to write the following document to the 'an' datacenter by default:

```
{
   "_id" : ObjectId("56f08c447fe58b2e96f595fa"),
   "message_id": 329620,
   "datacenter" : "alfa",
   "userid" : 123,
   ...
}
```

If, for example, the system receives an error on a attempted write, or if the write acknowledgement takes too long, the system can be configured to log the datacenter as unavailable and alter the datacenter field to point to the bravo datacenter as follows:

```
{
   "_id" : ObjectId("56f08c457fe58b2e96f595fb"),
   "message_id" : 329620,
   "datacenter" : "bravo",
   "userid" : 123,
   ...
}
```

In some embodiments, the system can be configured to periodically check datacenters for connectivity. If the datacenter is reachable again, the system can be configured to resume normal writes. For example, the system can be configured to resume writing to a default datacenter designation for the data item (e.g., based on a key value). In some embodiments, the system's switching logic may allow for potential document duplication. When performing reads, the system can be configured to resolve any duplicate documents on the application layer. For example, the following query searches for documents where the user ID is 123. Note that while user ID is part of the shard key, the query does not include the datacenter field, and therefore does not perform a targeted read operation:

db.collection.find({"userid": 123})

The results may, for example, show that the document with message_id of 329620 has been inserted into MongoDB twice, probably as a result of a delayed write acknowledgement. Below are an example result of a data item being duplicated in two separate datacenters.

```
{
   "_id" : ObjectId("56f08c447fe58b2e96f595fa"),
   "message_id" : 329620
   "datacenter" : "alfa",
   "userid" : 123,
   data : {...}
}
{
   "_id" : ObjectId("56f08c457fe58b2e96f595fb"),
   "message_id" : 329620
   "datacenter" : "bravo",
   "userid" : 123,
   ...
}
```

In some embodiments, the system can be configured to either ignore the duplicates. For example, the system can be configured to retrieve one of the two documents in response to a read request. In some embodiments the system can be configured to result the duplicates. For example, the system can be configured to trim the duplicates until only a single document remains.

In one example implementation, the system can be configured to use a ObjectId.getTimestamp( ) method to extract the timestamp from the _id field. In some embodiments, the system can be configured to keep either the first document inserted, or the last document inserted. In some embodiments, this assumes the _id field uses the MongoDB ObjectId. For example, using getTimestamp( ) on the document with ObjectId("56f08c447fe58b2e96f595fa") returns:
    ISODate("2016-03-22T00:05:24Z")
Using getTimestamp( ) on the document with ObjectId ("56f08c457fe58b2e96f595fb") returns:
    ISODate("2016-03-22T00:05:25Z")
The system can be configured to remove one of the two objects.

In some embodiments, the system can be configured to analyze one or more operations on the distributed database and select a target shard to optimize a system hosting the target shard for storage of data by the system. For example, the system may comprise one or more datacenters that host the target shard (e.g., nodes of the target shard as illustrated in FIG. 9). In another example, the system may host multiple shards that store data for multiple different applications. In yet another example, the system may host multiple shards using different types of storage hardware that provide different levels of performance. The system may be configured to select the target shard to optimize performance of the system hosting the target shard.

In some embodiments, the system can be configured to optimize performance of a database system based on location. In some embodiments, the system selects a target shard for one or more operations to optimize performance of a system hosting the target shard based on location. For example, the system may comprise multiple datacenters that are located in different regions. To provide faster response to a user, and reduce resources required for data transfer, the system can be configured to select the target shard to insure that the datacenter closest to a device requesting the operation is selected. In some embodiments, the system can be configured to determine a location associated with an operation. For example, the system can be configured to determine that the operation originated from a particular location. In some embodiments, the system can determine a location associated with the operation based on key values of one or more data items associated with the operation. For example, for a write operation to store a new data item, the system can be configured to generate a key value for the data item based on an indicator of the geographic location from where the data item originated. In another example, a user may assign a geographic location to a new data item that is to be stored, and the system can be configured to generate the key value using the assigned geographic location. In some embodiments, the system can be configured to use the location associated with the operation to select the target shard.

In some embodiments, the system can be configured to optimize a database to store data for multiple different applications. In some embodiments, the system can be configured to select the target shard for one or more operations to optimize performance of a system storing data for multiple different applications. In some embodiments, the system can be configured to allocate different shards for different applications. Accordingly, an application using the database can access and store data more efficiently as the system does not have to search and/or account for data from other applications in a respective shard. In some embodiments, the system can be configured to automatically map an application identifier to an operation. For example, the system can be configured to generate a key value for one or more data items to be stored in the database based on an identifier of an application from which the data item(s) is sourced. In another example, the system can be configured to map an application identifier to an operation based on an application from which the operation was requested. In some embodiments, the system can be configured to select the target shard to maintain a separation of data among multiple shards hosted by the system. For example, the system can be configured to select the target shard to write new data to in response to identifying that the target shard has been configured to store data for an application from which the write operation was requested.

In some embodiments, the system can be configured to increase availability of a database system. In some embodiments, the system can be configured to select a target shard for an operation to optimize availability of the system to one or more client systems. In some embodiments, the system can be configured to store data on multiple different datacenters. For example, the system may store one or more shards among the datacenters. In some embodiments, the system can be configured to store nodes of a shard across multiple ones of the datacenters. For example, the system can be configured to host a first node of the shard on a first datacenter and a second node of the shard on a second datacenter. In some embodiments, each of the nodes may comprise a replica set of the data stored on the shard. For example, a primary node may be hosted on the first datacenter and a secondary node may be hosted on the second datacenter. In some embodiments, the system can be configured to route operations to the primary node. For example, the system can be configured to route read and/or write requests received from applications to the first datacenter hosting the primary node. The first datacenter, however, may become available for a period of time. For example, a power loss, restart of the datacenter, or other occurrence may make the first datacenter unavailable for the period of time. In some embodiments, when the first datacenter is unavailable, the system can be configured to route the operation(s) to the second node hosted by the second datacenter. For example, read or write requests from applications can be routed to the second node when the system determines that the first datacenter and/or primary node are unavailable. In this manner, the system can be configured to provide a database with improved availability.

In some embodiments, the system can be configured to route one or more operations to a target shard based on a level of performance. In some embodiments, it may increase the efficiency of the system to provide certain types of operations with a higher level of performance. For example, data that has been stored more recently may be more frequently accessed by a client than data that has been stored for a longer period of time. In some embodiments, the system can be configured to select the target shard to provide operations involving recently stored data with the higher level of performance, and to provide operations involving older data with a lower level of performance. By doing so, the system may provide more frequent operations with a higher level of performance while providing less frequent operations with a lower level of performance and thus improve overall performance of the system. In some embodiments, the system can include multiple different types of storage hardware. Different types of storage hardware may provide different levels of performance. For example, the system can include solid state drives that provide faster data access, and spinning disks that provide slower data access. Data that is accessed more frequently (e.g., recently generated data) can be stored on the solid state drives, while data accessed less frequently (e.g., data stored for a longer period of time) can be stored on the spinning disks. In some embodiments, shards can be stored using particular types of hardware. For example, a first shard can be stored on one or more solid state drives while a second shard can be stored on one or more spinning disks. The system can then be configured to route an operation to a particular type of hardware to optimize performance. For example, the system can be configured to route operations associated with recently generated data to the first shard stored on the solid state drive(s) and route operations associated with older data to the second shard stored on the spinning disk(s) to improve system operational efficiency in performing operations.

According to another aspect, the system can include processes or daemons configured to capture operation data for the distributed database (e.g., read, writes, load balancing, storage engine activity, etc.). The monitor processes can be configured to record operation information on the volume, timing, type, (e.g., read, write, update, etc.), location, (e.g., origination location of request, destination location of hosted data, etc.), among other options. In some embodiments, the system can be configured to optimize the distribution of shards of data based on analysis of the monitored data. Various embodiments of monitoring processes and database analysis examples are described in co-pending U.S. application Ser. No. 14/992,225 entitled "DISTRIBUTED DATABASE SYSTEMS AND METHODS WITH PLUGGABLE ENGINES) filed Jan. 11, 2017 incorporated herein by reference, and can be used to capture operation data.

In one implementation, with the captured data the system can be configured to identify options to optimize allocation of shards, and optimize allocation of resources to specific shards. In one example, a write heavy shard can be allocated specific hardware to support faster write access. In further examples, shards with heavily write loads can be instantiated with additional hardware support (e.g., SSD drives) and can be instantiated based on a location closest to the origination of the write requests. The system is configured to analyze the type of operation for potential optimization. For example, a primary node of a shard can be located closer to the majority of the write heavy traffic, while a secondary node of the same shard can be located closer to the majority of the read traffic being executed against that data. Such fine tuning presents improvements in the operational efficiency of the databased and, when promulgated across a distributed database architecture, yields significant improvements efficiency, data retrieval, and write operations.

In some embodiments, the location of existing nodes (e.g., secondary node closest to write traffic) can be used to alter primary node election protocols. Co-pending U.S. application Ser. No. 15/074,987 entitled "METHOD AND APPARATUS FOR MAINTAINING REPLICA SETS" filed on Mar. 18, 2016 incorporated herein by reference describes example election protocols and replica set architectures that can be augmented with location aware tagging of shards. In some embodiments, where a secondary node is closest to the origin of the majority of write traffic, the system can be configured to trigger a new primary election or new primary node selection to elevate the secondary node (closest to write traffic) to primary status so that the node now handles write requests from clients. The reverse scenario also applies, where a primary node is closest to the read traffic being executed on the shard, the primary node can be demoted to secondary status. For example, in architectures where secondary nodes handle only read requests, the system can be configured to trigger a demotion of a primary node to a secondary node where the primary node was located nearest to a majority of read requests. The re-allocation of node responsibility based on the location monitoring, and analysis frees up resources on the new primary node to better process any write operations, and the old primary (now a secondary node) is tailored specifically to the database operations it receives the most. Dynamically adjusting database node responsibility within a shard or replica set based on operational efficiency is a significant improvement over many conventional database architectures.

In some embodiments, the system can be configured to trigger election of a primary nodes based on a stored set of one or more rules. The rules may define conditions for triggering an election. For example, the system can be configured to monitor write operations and a location from where the write operations originated. In this example, the system can be configured to trigger an election of a new primary node in response to detecting that a majority of write operations over a period of time are originating from one or more geographic locations that are closer to a secondary node of a shard. In response, the system can be configured to trigger an election such that the secondary node that is closer to the geographic location(s) where the majority of write operations are originated from is promoted to a primary node, while the previous primary node is demoted to a secondary node. In another example, the system can be configured to monitor read operations and a location from where the read operations originate. In this example, the system can be configured to trigger an election in response to detecting that a majority of read operations over a period of time are originating from one or more geographic locations that are closer to a primary node of the shard than to one or more secondary nodes. The system may then demote the primary node to a secondary node such that it now receives the read operation requests from the geographic location(s) that the node is closest to.

In some embodiments, the system can be configured to store rules that trigger elections based on conditions. For example, the system can be configured to trigger an election in response to a disaster condition (e.g., power loss or other loss of operation). In some embodiments, if the system determines a disaster condition at a geographic location of one of the nodes, the system may prevent the node from becoming a primary node. For example, the system can be configured to eliminate the node from being considered as a potential primary node during an election protocol. In some embodiments, the system can be configured to modify and/or prevent election trigger rules in response to detecting one or more conditions (e.g., a disaster condition).

In some embodiments, the system can be configured to store data using different types of storage hardware which provide different levels of performance. For example, the system may store data on solid state drives that provide write and read access at a first speed, and may store data on spinning disk drives that provide write and read access at a second speed that is slower than the first speed. In some embodiments, the system can be configured to analyze operations and/or data stored by the system to store data across different types of storage hardware to optimize performance of the system. In some embodiments, the system can be configured to determine a set of data that is accessed by a client more frequently. For example, the system can be configured to identify data that has been generated (e.g., written) more recently as data that may be more frequently accessed by the client. The system can be configured to migrate the identified data that is accessed more frequently to storage hardware that provides higher level of performance (e.g., solid state drives). In some embodiments, the system can be configured to identify data that is access less frequently by a client, and migrate the data to storage hardware that provides a lower level of performance (e.g., spinning disk drives). In this manner, the system may reserve high performing storage hardware space for data items that are accessed frequently by a client and, in turn, optimize performance of the system in performing operations.

In some embodiments, the system can be configured to determine to determine a level of performance for data based on one or more attributes of the data. For example, the system can be configured to determine a level of performance based on a date that the data was generated. In another example, the system can be configured to determine the level of performance based on a date that the data was last updated. In yet another example, the system can be configured to determine a level of performance based on an identity of the client from which the data was originated. In some embodiments, the system can be configured to determine the level of performance based on service level agreements, service level objectives, location associated with the data, time at which the data was generated, a client associated with the data, a user associated with the data, and/or other factor. Some embodiments are not limited to how the system determines a level of performance for data.

Systems and techniques for triggering and/or performing election of a primary node are described in application Ser. No. 15/074,987 entitled "METHOD AND APPARATUS FOR MAINTAINING REPLICA SETS" filed on Mar. 18, 2016, and incorporated herein by reference.

API Integration Examples

According to one aspect, a cloud based database system is provided. The system can be configured to interface with a plurality of cloud service providers (e.g. Amazon Web Services, Google Cloud, Microsoft Azure). The system can provide cross-crowd availability. The system can allow services to users wherever a particular cloud service provider offers the best service. The system can be configured to provide database services to database systems residing on any cloud. The services may, for example, comprise full stack infrastructure management, operational intelligence, and lifecycle management.

In some embodiments, the cloud based databased service system may include MongoDB Atlas. End users may interact with a website (e.g., MongoDB website) to order or specify needed database parameters. In some embodiments, the system may limit the needed information to a small set of configuration features that are used with template or pre-configured architectures to provide a cloud instantiated database in a short period of time and with minimal user input. The system may then provision any needed resources (e.g., Amazon Web Services (AWS) API, Google API, Azure API) and installs necessary software, builds, etc. The software may include, for example, monitoring agents for automating functions. By provisioning the needed resources, the system may provide a fully functional database. In some embodiments, the system may further integrate Google Cloud resources and Microsoft Cloud resources.

According to one aspect, the system preserves consistent availability in a database while performing rolling administration operations (e.g., scaling up or down of a database cluster (e.g., shard or replica set). Additionally, the system may eliminate a complex order of operations required for administrative tasks and reduce the complex order of operations into searchable states that can be passed/executed by cloud based management. In some embodiments, the system may further roll instantiation of new database nodes with next state or instantiate a new node(s) to bring to fully updated start. The system may, for example, mirror existing resources (e.g., nodes).

In some embodiments, the system may provide super automation. The system may include automation agents which incorporate new cloud instantiation. The automation agents may build new resources (e.g., replicated nodes) with full updates and new configurations built in. In some embodiments, the automation agents may Q&A new nodes prior to switching over.

Furthermore, databases provide options for implementing database architecture in the cloud. It is realized that better resource utilization and allocation can be achieved if different cloud provider systems are utilized. Currently, significant hurdles exists in creating a distributed database that crosses between cloud providers. Various embodiments provide a custom architecture that maintains secure connections between database elements (e.g., MongoDB nodes (e.g., primary, secondary, arbiters, etc.) distributed across cloud providers. In some examples, architecting a distributed database across provides makes the resulting system more fault tolerant, as catastrophic failures in multiple location and over multiple cloud providers would have to occur to render the distributed database unavailable.

Atlas API Access

In some embodiments, to access the API, the system generates own API key. In some embodiments, to access whitelisted API operations, the system can be configured with an API whitelist with the IP addresses it can use when issuing the whitelisted commands. The system may further have the Owner role (e.g., or similar security setting to enable execution) to issue whitelisted commands.

In some embodiments, an Atlas API may serve to provide programmatic access to Atlas's features. In some embodiments, an Atlas interface can comprise a user interface through which Atlas users can carry out various database related activities such as reading, writing, updating, inserting, and deleting data in the cluster as well as other functions. In some embodiments, the Atlas interface may comprise an interface provided by a database application or other integration system configured to provide an interface to Atlas (e.g., MongoDB driver, Compass, mongo Shell, Data Explorer). In some embodiments, the Atlas API can be configured to enable programs and/or applications to access features provided by an existing Atlas interface(s).

In some embodiments, to access the Atlas API, the system generates an API key, which gives access to the API. For each user that uses the API, the system may generate a key. In one embodiment, the system may have up to ten API keys associated with an account. In some embodiments, each key can be either enabled or disabled but all count toward the ten-key limit. An API key may be like a password. In one embodiment, when a user accesses Atlas through the API, the system may allow the same level of access as the user had through the Atlas interface. Atlas roles apply may to both the interface and the API.

In some embodiments, address-based whitelists protect certain API operations. Only client requests that originate from a whitelisted IP address are permitted to perform the operations. To perform whitelisted operations, the system can add at least one address to a whitelist. Users have their own whitelists and own API keys. In some embodiments, when the system issues an API call, the system can be configured to use an API key from a user account and can be configured to issue the command from an address on the user account's whitelist. In some embodiments, the system cannot use a key to issue a whitelisted API request from an address on another user's whitelist, unless, the system has added that address to its own whitelist.

In some embodiments, an IP whitelist entry may include the following:
   An IP address (access to whitelisted operations granted from address)
   A CIDR-notated range of IP addresses (access to whitelisted operations granted from these addresses)
   0.0.0.0/0 (unrestricted access to whitelisted operations)
   In some embodiments, a group IP controls client access to a group's MongoDB clusters.

In some embodiments, clients can connect to clusters only from IP addresses on the whitelist. In some embodiments, entries can be added to the whitelist. If an IP address is already in the whitelist, the system can be configured to generate an error. In some embodiments, entries can be deleted from an IP whitelist. In one implementation, an entity may include the following:
   cidrBlock—the whitelist entry in CIDR notation
   ipAddress—the whitelisted IP address (may not be needed if using cidrBlock)
   groupID—ID of the group containing the whitelist entry
   comment—comment to associate with the whitelist entry
   In some embodiments, a root resource is the starting point for the Atlas API. The base URL may be, for example, https://cloud.mongodb.com.

In some embodiments, a request query may include the following parameters:
   pageNum—The page to return
   itemsPerPage—Maximum number of items to return per page
   envelope—A boolean that specifies whether or not to wrap the response in an envelope.
In some embodiments, the response elements for a query may include:
   appName
   build—The SHA that corresponds to the GitHub commit for the Atlas
   links—Array of links to related API resources
   In some embodiments, a database user resource enables users to retrieve, create and modify the MongoDB users in a cluster. Each user has a set of roles that provide access to the group's databases. A user's roles apply to all the clusters in the group: if two clusters have a products database and a user has a role granting read access on the products database, the user has that access on both clusters. Each user also has a username, password, and authentication database used to log into MongoDB. Atlas deployments of MongoDB use admin as the authentication database for all users. The authentication database does not determine a user's roles. In some embodiments, the system may provide an ability to create, update, and/or delete a database user.
Cluster Configuration Information
   In some embodiments, the system may include an API to enable users to describe a database resource (e.g. a MongoDB cluster) with a minimal set of information. In some embodiments, the information may include a number of nodes, amount of memory, storage automatic cluster, and other information. In some embodiments, the system may maintain a small JSON blob(s) that describes minimum features and maps cluster generation to nodes, communication between nodes, security, data handling (storage engine), connections to database (e.g., direct or indirect for app services), etc. The system may use a template of cluster descriptions.

In some embodiments, the API enables users to access their MongoDB cluster configuration. The API may provide access to one or more of the following configuration information items: a cluster name, group ID of a group that the cluster belongs to, MongoDB version that the cluster is running, a connection string for connecting to the cluster, a listing of when the connection string was updated, a number of shards in the cluster, the replication factor (i.e., number of replica set members), configuration of provisioned servers (e.g., cloud servers) on which MongoDB is running, a cloud service provider name, a physical location of the cluster, an name of an instance size used for the cluster, the maximum input/output operations per second (IOPS) the system can perform, an indication of whether data is encrypted in the cluster, a disk storage size of a server the cluster is running on, an indication of whether backup is enabled, and a current state of the cluster.

In some embodiments, if number of shards is set to 1, the cluster is a replica set. If this is set to 2 or higher, the cluster is a sharded cluster with the number of shards specified.

In some embodiments, the system provides different instance sizes, each with a default RAM size, storage capacity, and maximum storage speed. In some embodiments, the system can be configured to use a selected size for all the data bearing servers in a cluster. In one implementation, the system can customize the instance size using the diskSizeGB and providerSettings.diskIOPS fields.

In some embodiments, the available IOPS depend on the instance size: each instance size has a specific set of available IOPS values.

In some embodiments, if encryption is enabled, the encryption feature encrypts the server's root volume for both data at rest within the volume and for data moving between the volume and the instance.

In some embodiments, the disk size is the size in gigabytes of the server's root volume. In some embodiments, the system can add capacity by increasing this number, up to a maximum possible value of 16384 (i.e., 16 TB). In one implementation, each instance size has its own default value. If a value is set below the instance default, the system (e.g., Atlas) can be configured to replace it with the default value.

In some embodiments, if backup is enabled, the system can be configured to take snapshots of databases at regular intervals and retains them according to a group's retention policy.

In one implementation, the physical location of the cluster may be indicated by a string corresponding to a particular region. For example, a cluster location may be set to one of the following values:
   'US_EAST_1'
   'US_EAST_2'
   'US_WEST_1'
   'US_WEST_2'
   'CA_CENTRAL_1'
   'EU_WEST_1'
   'EU_WEST_2'
   'EU_CENTRAL_1'
   'AP_NORTHEAST_1'
   'AP_NORTHEAST_2'
   'AP_SOUTHEAST_1'
   'AP_SOUTHEAST_2'
   'AP_SOUTH_1'
   'SA_EAST_1'

In one implementation, a state of the cluster may be one of a plurality of possible states. For example, the cluster state may be set to one of the following:

IDLE
CREATING
UPDATING
DELETING
DELETED
REPAIRING

Below is an example request command for information for a cluster with name "LogData" and in group with ID 5356823b3794de37132bb7b.

```
Request:
    curl    -i    -u    "username:apiKey"    --digest
"https://cloud.mongodb.com/api/atlas/v1.0/groups/
5356823b3794de37132bb7b/clusters/LogData"
    Response:
    HTTP/1.1 200 OK
    {
        "name" : "LogData",
        "backupEnabled" : true,
        "diskSizeGB" : 80,
        "groupId" : "5356823b3794de37132bb7b",
        "mongoDBVersion" : "3.2.8",
        "mongoURI"     :     "mongodb://logdata-shard-00-00-
ub6lu.mongodb.net:37017,logdata-shard-00-01-
ub6lu.mongodb.net:37017,logdata-shard-00-02-
ub6lu.mongodb.net:37017,logdata-shard-01-00-
ub6lu.mongodb.net:37017,logdata-shard-01-01-
ub6lu.mongodb.net:37017,logdata-shard-01-02-
ub6lu.mongodb.net:37017",
        "mongoURIUpdated" : "2016-08-02T20:16:23Z",
        "numShards" : 2,
        "providerSettings" : {
            "providerName" : "AWS",
            "diskIOPS" : 240,
            "encryptEBSVolume" : false,
            "instanceSizeName" : "M40",
            "regionName" : "US_EAST_1"
        },
        "replicationFactor" : 3,
        "stateName" : "IDLE"
    }
```

Advanced Monitoring

In some embodiments, the system may execute advanced monitoring processes on database nodes. The monitoring may report back on conditions. For example, the monitoring process may report additional resource are needed. In response, the system may automatically instantiate new cloud resources. In one implementation, the system may mirror existing nodes.

In some embodiments, the system may have alerts. The system may trigger alerts that notify a user(s) when database operations or server usage reaches a threshold(s) that affects cluster performance. The alerts and responses may be configured by a user. In one embodiment, the system may display a symbol and/or send notification(s) in response to detecting an alert. In some embodiments, the system may continue sending notifications at regular intervals until a condition is resolved, the alert is disabled, or the alert is deleted.

In some embodiments, the system may require an alert acknowledgement from a user(s). In one implementation, the system may present a user interface that displays alerts to a user. The user interface may comprise a tab or page of a webpage or mobile application that displays present alerts. The system may receive an acknowledgement from a user via this user interface page. In response to receiving an acknowledgement, the system may wait for an acknowledgement period. If the alert condition ends during the acknowledgement period, the system may send a notification to a user(s).

Example Computer System

Figure 10:
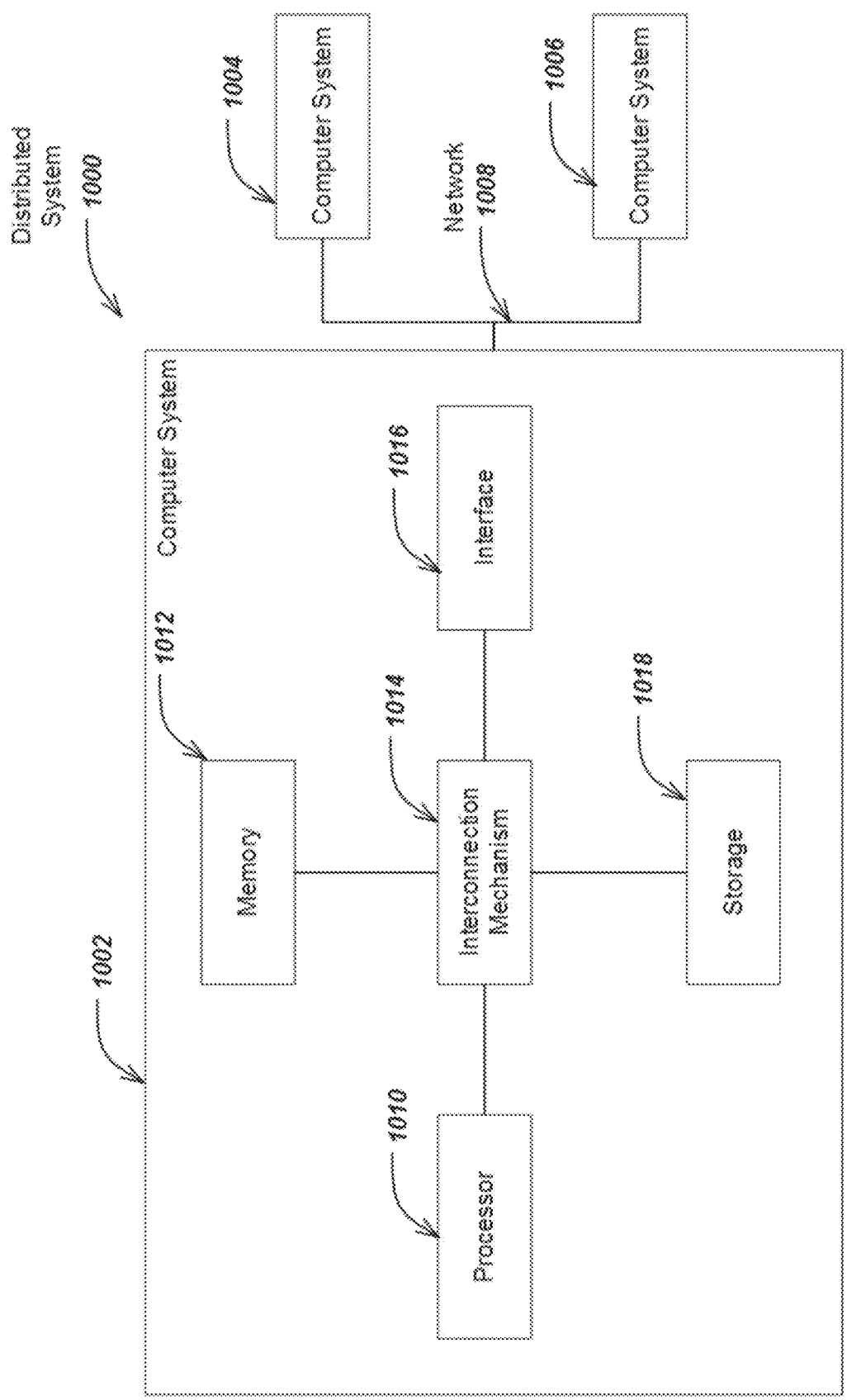
FIG. 10 shows a block diagram of a computer system in which various aspects of the present invention can be practiced.

Referring to FIG. 10, there is illustrated a block diagram of a specially configured distributed computer system 1000, in which various aspects and functions are practiced. As shown, the distributed computer system 1000 includes one or more computer systems that exchange information. More specifically, the distributed computer system 1000 includes computer systems 1002, 1004, and 1006. As shown, the computer systems 1002, 1004, and 1006 are interconnected by, and may exchange data through, a communication network 1008. The network 1008 may include any communication network through which computer systems may exchange data. To exchange data using the network 1008, the computer systems 1002, 1004, and 1006 and the network 1008 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 1002, 1004, and 1006 may transmit data via the network 1008 using a variety of security measures including, for example, SSL or VPN technologies. While the distributed computer system 1000 illustrates three networked computer systems, the distributed computer system 1000 is not so limited and may include any number of computer systems and computing devices, networked using any medium and communication protocol.

As illustrated in FIG. 10, the computer system 1002 includes a processor 1010, a memory 1012, an interconnection element 1014, an interface 1016 and data storage element 1018. To implement at least some of the aspects, functions, and processes disclosed herein, the processor 1010 performs a series of instructions that result in manipulated data. The processor 1010 may be any type of processor, multiprocessor or controller. Example processors may include a commercially available processor such as an Intel Xeon, Itanium, Core, Celeron, or Pentium processor; an AMD Opteron processor; an Apple A10 or A5 processor; a Sun UltraSPARC processor; an IBM Power5+ processor; an IBM mainframe chip; or a quantum computer. The processor 1010 is connected to other system components, including one or more memory devices 1012, by the interconnection element 1014.

The memory 1012 stores programs (e.g., sequences of instructions coded to be executable by the processor 1010) and data during operation of the computer system 1002. Thus, the memory 1012 may be a relatively high performance, volatile, random access memory such as a dynamic random access memory ("DRAM") or static memory ("SRAM"). However, the memory 1012 may include any device for storing data, such as a disk drive or other nonvolatile storage device. Various examples may organize the memory 1012 into particularized and, in some cases, unique structures to perform the functions disclosed herein. These data structures may be sized and organized to store values for particular data and types of data.

Components of the computer system 1002 are coupled by an interconnection element such as the interconnection mechanism 1014. The interconnection element 1014 may include any communication coupling between system components such as one or more physical busses in conformance with specialized or standard computing bus technologies such as IDE, SCSI, PCI and InfiniBand. The interconnection element 1014 enables communications, including instructions and data, to be exchanged between system components of the computer system 1002.

The computer system 1002 also includes one or more interface devices 1016 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1002 to exchange information and to communicate with external entities, such as users and other systems.

The data storage element 1018 includes a computer readable and writeable nonvolatile, or non-transitory, data storage medium in which instructions are stored that define a program or other object that is executed by the processor 1010. The data storage element 1018 also may include information that is recorded, on or in, the medium, and that is processed by the processor 1010 during execution of the program. More specifically, the information may be stored in one or more data structures specifically configured to conserve storage space or increase data exchange performance. The instructions may be persistently stored as encoded signals, and the instructions may cause the processor 1010 to perform any of the functions described herein. The medium may, for example, be optical disk, magnetic disk or flash memory, among others. In operation, the processor 1010 or some other controller causes data to be read from the nonvolatile recording medium into another memory, such as the memory 1012, that allows for faster access to the information by the processor 1010 than does the storage medium included in the data storage element 1018. The memory may be located in the data storage element 1018 or in the memory 1012, however, the processor 1010 manipulates the data within the memory, and then copies the data to the storage medium associated with the data storage element 1018 after processing is completed. A variety of components may manage data movement between the storage medium and other memory elements and examples are not limited to particular data management components. Further, examples are not limited to a particular memory system or data storage system.

Although the computer system 1002 is shown by way of example as one type of computer system upon which various aspects and functions may be practiced, aspects and functions are not limited to being implemented on the computer system 1002 as shown in FIG. 10. Various aspects and functions may be practiced on one or more computers having a different architectures or components than that shown in FIG. 10. For instance, the computer system 1002 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1002 may be a computer system including an operating system that manages at least a portion of the hardware elements included in the computer system 1002. In some examples, a processor or controller, such as the processor 1010, executes an operating system. Examples of a particular operating system that may be executed include a Windows-based operating system, such as, Windows NT, Windows 2000 (Windows ME), Windows XP, Windows Vista or Windows 7, 8, or 10 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 1010 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C # (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A database system comprising:
a plurality of shards storing a plurality of data items;
at least one processor configured to:
generate a plurality of zones including a first zone and a second zone, the generating comprising:
associating a first one of the plurality of shards with the first zone comprising mapping the first zone to a first range of key values; and
associating a second one of the plurality of shards with the second zone comprising mapping the second zone to a second range of key values;
mapping a first set of the plurality of data items to the first zone, comprising determining that each of the first set of data items has a shard key value within the first range;
in response to mapping the first set of data items to the first zone, storing the first set of data items in the first shard;
mapping a second set of the plurality of data items to the second zone, comprising determining that each of the second set of data items has a shard key value within the second range;
in response to mapping the second set of data items to the second zone, storing the second set of data items in the second shard;
receiving data indicative of (a) a modification of the first range of key values that modifies the first range of key values to a modified first range of key values, and (b) a third zone mapped to a third range of key values;
determining one or more of the data items of the first set of data items comprise a shard key value outside of the shortened first range of key values and within the third range of key values; and
mapping the determined one or more data items to the third zone.

2. The database system of claim 1, wherein the at least one processor is configured to associate the first zone with a first datacenter and the second zone with a second datacenter.

3. The database system of claim 2, wherein the first shard comprises a plurality of nodes and the at least one processor is configured to store a majority of the plurality of nodes in the first datacenter.

4. The database system of claim 1, wherein the first range of key values and the second range of key values are mutually exclusive.

5. The database system of claim 1, wherein the at least one processor is configured to: generate a first tag for the first zone and a second tag for the second zone; and
associate the first shard with the first tag and the second shard with the second tag.

6. The database system of claim 1, wherein the at least one processor is configured to associate the first zone with a first geographic location and the second zone with a second geographic location.

7. The database system of claim 6, further comprising a routing service, executed by the at least one processor, configured to:
map the first set of data items to the first zone in response to determining an association of the first set of data items with the first geographic location; and
map the second set of data items to the second zone in response to determining an association of the second set of data items with the second geographic location.

8. The database system of claim 1, wherein the at least one processor is configured to associate the first zone with a first application and the second zone with a second application.

9. The database system of claim 1, wherein the at least one processor is further configured to store the one or more data items in a third shard of the third zone.

10. A computer-implemented method of storing data in a database, the method comprising:
storing a plurality of data items in a plurality of shards;
generating a plurality of zones including a first zone and a second zone, the generating comprising:
associating a first of the plurality of shards with the first zone, comprising mapping the first zone to a first range of key values; and
associating a second one of the plurality of shards with the second zone, comprising mapping the second zone to a second range of key values;
mapping a first set of the plurality of data items to the first zone, comprising determining that each of the first set of data items has a shard key value within the first range;
in response to mapping the first set of data items to the first zone, storing the first set of data items in the first shard;
mapping a second set of the plurality of data items to the second zone, comprising determining that each of the second set of data items has a shard key value within the second range;
in response to mapping the second set of data items to the second zone, storing the second set of data items in the second shard;
receiving data indicative of (a) a modification of the first range of key values that modifies the first range of key values to a modified first range of key values, and (b) a third zone mapped to a third range of key values;

determining one or more of the data items of the first set of data items comprise a shard key value outside of the shortened first range of key values and within the third range of key values; and mapping the determined one or more data items to the third zone.

11. The method of claim 10, further comprising storing the one or more data items in a third shard of the third zone.

12. The method of claim 10, further comprising routing a new data item for storage to the first shard in response to mapping the new data item to the first zone.

13. The method of claim 10, further comprising associating the first zone with a first datacenter and the second zone with a second datacenter.

14. The method of claim 13, further comprising:
storing a majority of nodes of the first shard in the first datacenter; and
storing the first set of data items in the first datacenter.

15. The method of claim 10, further comprising:
generating the first range of key values for the first zone; and
generating the second range of key values for the second zone.

16. The method of claim 15, further comprising generating the first range of key values mutually exclusive from the second range of key values.

17. The method of claim 10, further comprising:
generating a first tag for the first zone and a second tag for the second zone;
mapping the first shard to the first tag; and
mapping the second shard to the second tag.

18. The method of claim 10, further comprising:
routing a new data item for storage to the first shard in response to determining association of the new data item with a first geographic location; and
routing the new data item for storage to the second shard in response to determining association of the new data item with the second geographic location.

19. At least one non-transitory computer-readable storage medium storing instructions, the instructions, when executed by at least one processor, cause the at least one processor to perform a method comprising:
storing a plurality of data items in a plurality of shards;
generating a plurality of zones including a first zone and a second zone, the generating comprising:
associating a first of the plurality of shards with the first zone,
comprising mapping the first zone to a first range of key values; and
associating a second of the plurality of shards with the second zone, comprising mapping the second zone to a second range of key values;
mapping a first set of the plurality of data items to the first zone, comprising determining that each of the first set of data items has a shard key value within the first range;
in response to mapping the first set of data items to the first zone, storing the first set of data items in the first shard;
mapping a second set of the plurality of data items to the second zone, comprising determining that each of the second set of data items has a shard key value within the second range;
in response to mapping the second set of data items to the second zone, storing the second set of data items in the second shard;
receiving data indicative of (a) a modification of the first range of key values that modifies the first range of key values to a modified first range of key values, and (b) a third zone mapped to a third range of key values;
determining one or more of the data items of the first set of data items comprise a shard key value outside of the shortened first range of key values and within the third range of key values; and
mapping the determined one or more data items to the third zone.

20. The method of claim 19, further comprising:
generating the first range of key values for the first zone; and
generating the second range of key values for the second zone.

* * * * *

UNITED STATES PATENT AND TRADEMARK OFFICE
CERTIFICATE OF CORRECTION

| | | |
|---|---|---|
| PATENT NO. | : 10,997,211 B2 | Page 1 of 2 |
| APPLICATION NO. | : 16/013706 | |
| DATED | : May 4, 2021 | |
| INVENTOR(S) | : Dwight Merriman et al. | |

It is certified that error appears in the above-identified patent and that said Letters Patent is hereby corrected as shown below:

In the Specification

At Column 1, Lines 6-67, please delete the paragraph and replace with the paragraph shown below:
--This Application is a Continuation-in-part of U.S. Application Serial No. 15/654,590, filed July 19, 2017, entitled "SYSTEM AND METHOD FOR OPTIMIZING DATA MIGRATION IN A PARTITIONED DATABASE", which is a Continuation of U.S. Application Serial No. 13/078,104, filed April 1, 2011, entitled "SYSTEM AND METHOD FOR OPTIMIZING DATA MIGRATION IN A PARTITIONED DATABASE". This Application is a Non-Provisional of Provisional (35 USC 119(e)) of U.S. Application Serial No. 62/522,222, filed June 20, 2017, entitled "SYSTEMS AND METHODS FOR DATABASE API INTEGRATION AND ZONE SHARDING". This Application is a Continuation-in-part of U.S. Application Serial No. 15/605,391, filed May 25, 2017, entitled "AGGREGATION FRAMEWORK SYSTEM ARCHITECTURE AND METHOD", which is a Non-Provisional of Provisional (35 USC 119(e)) of U.S. Application Serial No. 62/341,511, filed May 25, 2016, entitled "AGGREGATION FRAMEWORK SYSTEM ARCHITECTURE AND METHOD". Application 15/605,391 is a Non-Provisional of Provisional (35 USC 119(e)) of U.S. Application Serial No. 62/341,490, filed May 25, 2016, entitled "AGGREGATION FRAMEWORK SYSTEM ARCHITECTURE AND METHOD". Application 15/605391 is a Continuation-in-part of U.S. Application Serial No. 15/042,297, filed February 12, 2016, entitled "AGGREGATION FRAMEWORK SYSTEM ARCHITECTURE AND METHOD", which is a Continuation of U.S. Application Serial No. 13/951,987, filed July 26, 2013, entitled "AGGREGATION FRAMEWORK SYSTEM ARCHITECTURE AND METHOD", which is a Continuation-in-part of U.S. Application Serial No. 13/794,710, filed March 11, 2013, entitled "AGGREGATION FRAMEWORK SYSTEM ARCHITECTURE AND METHOD", which is a Non-Provisional of Provisional (35 USC 119(e)) of U.S. Application Serial No. 61/676,188, filed July 26, 2012, entitled "AGGREGATION FRAMEWORK SYSTEM ARCHITECTURE AND METHOD". Application 13/951,987 is a Non-Provisional of Provisional (35 USC 119(e)) of U.S. Application Serial No. 61/676,188, filed July 26, 2012, entitled "AGGREGATION FRAMEWORK SYSTEM ARCHITECTURE AND METHOD". Application 15/605391 is a Continuation-in-part of U.S. Application Serial No. 14/672,901, filed March 30, 2015, entitled "AGGREGATION FRAMEWORK SYSTEM ARCHITECTURE AND METHOD", which is a Continuation of U.S. Application Serial No. 13/794,710, filed March 11, Signed and Sealed this
Third Day of October, 2023

Katherine Kelly Vidal
*Director of the United States Patent and Trademark Office*

2013, entitled "AGGREGATION FRAMEWORK SYSTEM ARCHITECTURE AND METHOD". This Application is a Continuation-in-part of U.S. Application Serial No. 15/074,987, filed March 18, 2016, entitled "METHOD AND APPARATUS FOR MAINTAINING REPLICA SETS", which is a Continuation of U.S. Application Serial No. 14/064,705, filed October 28, 2013, entitled "METHOD AND APPARATUS FOR MAINTAINING REPLICA SETS", which is a Continuation of U.S. Application Serial No. 12/977,563, filed December 23, 2010, entitled "METHOD AND APPARATUS FOR MAINTAINING REPLICA SETS". This Application is a Continuation-in-part of U.S. Application Serial No. 14/992,225, filed January 11, 2016, entitled "DISTRIBUTED DATABASE SYSTEMS AND METHODS WITH PLUGGABLE STORAGE ENGINES", which is a Non-Provisional of Provisional (35 USC 119(e)) of U.S. Application Serial No. 62/232,979, filed September 25, 2015, entitled "DISTRIBUTED DATABASE SYSTEMS AND METHODS WITH PLUGGABLE STORAGE ENGINES", each of which above referenced applications are herein incorporated by reference in their entirety."--